US008655268B2

(12) United States Patent
Suga

(10) Patent No.: US 8,655,268 B2
(45) Date of Patent: *Feb. 18, 2014

(54) RELAY STATION AND RADIO COMMUNICATION SYSTEM

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 109 days.

This patent is subject to a terminal disclaimer.

(21) Appl. No.: 13/242,714

(22) Filed: Sep. 23, 2011

(65) Prior Publication Data

US 2012/0008548 A1 Jan. 12, 2012

Related U.S. Application Data

(60) Division of application No. 12/429,340, filed on Apr. 24, 2009, which is a continuation of application No. PCT/JP2006/321299, filed on Oct. 25, 2006.

(51) Int. Cl.
*H04B 7/14* (2006.01)
*H04B 3/36* (2006.01)

(52) U.S. Cl.
USPC ............. 455/7; 455/11.1; 455/13.1; 370/315; 370/316

(58) Field of Classification Search
USPC ......... 455/7, 11.1, 13.1, 456.1; 370/315, 316, 370/322
See application file for complete search history.

(56) References Cited

U.S. PATENT DOCUMENTS

| 7,486,928 | B2 | 2/2009 | Izumikawa et al. |
| 7,693,122 | B2 | 4/2010 | Carlson et al. |
| 8,583,032 | B2 | 11/2013 | Imamura et al. |
| 2004/0192204 | A1 | 9/2004 | Periyalwar et al. |
| 2006/0046643 | A1 | 3/2006 | Izumikawa et al. |
| 2006/0116074 | A1 | 6/2006 | Kato et al. |
| 2006/0153132 | A1 | 7/2006 | Saito |
| 2006/0264172 | A1 | 11/2006 | Izumikawa et al. |
| 2007/0002821 | A1 | 1/2007 | Carlson et al. |
| 2007/0014237 | A1 | 1/2007 | Nishibayashi et al. |
| 2009/0047898 | A1 | 2/2009 | Imamura et al. |
| 2009/0052319 | A1 | 2/2009 | Muqattash et al. |

FOREIGN PATENT DOCUMENTS

| CN | 1798435 A | 7/2006 |
| CN | 101146327 A | 3/2008 |
| CN | 101385371 A | 3/2009 |
| JP | 2005311920 A | 11/2005 |

(Continued)

OTHER PUBLICATIONS

Notice of Allowance dated Aug. 24, 2011 received in U.S. Appl. No. 12/429,340.

(Continued)

*Primary Examiner* — Sujatha Sharma
(74) *Attorney, Agent, or Firm* — Smith, Gambrell & Russell, LLP

(57) ABSTRACT

In order to achieve effective utilization of radio communication resource, there is provided a relay station, for relaying a signal to be transferred between a radio base station and a radio terminal, which includes a storage section adapted to store communication controlling information for communication control with the radio terminal, a base station side signal reception section adapted to receive, from the radio base station, scheduling information in communication between the radio base station and the radio terminal through the relay station, a complementation section adapted to complement contents of the scheduling information received by the base station side signal reception section in accordance with the communication controlling information stored in the storage section, and a terminal side signal transmission section adapted to transmit the scheduling information whose contents are complemented by the complementation section to the radio terminal.

4 Claims, 18 Drawing Sheets

(56) References Cited

FOREIGN PATENT DOCUMENTS

| | | |
|---|---|---|
| JP | 200674325 | 3/2006 |
| JP | 2006196985 | 7/2006 |
| JP | 2006303802 | 11/2006 |
| JP | 2007515819 | 6/2007 |
| JP | 2008500753 | 1/2008 |
| JP | 2009543475 | 12/2009 |
| WO | 2005020517 A1 | 3/2005 |
| WO | 2005112355 A1 | 11/2005 |
| WO | 2005117361 | 12/2005 |
| WO | 2006104105 A1 | 10/2006 |

OTHER PUBLICATIONS

International Search Report dated Jan. 30, 2007.
H. Izumikawa, et al. "Effect of MAP Multiplexing in IEEE 802.16-based relayed system", YRP Research Center, KDDI R&D Laboratories Inc., B-5-140, IEICE General Conference 2006.
K. Saito, et al. "Proposal of radio relay control method for IEEE 802.16 Broadband Wireless Access System", KDDI R&D Laboratories Inc., B-5-156, IEICE General Conference 2005.
K. Saito , et al. "A proxy request method for IEEE 802.16 relayed terminal", YRP Research Center, KDDI R&D Laboratories Inc., B-5-138, IEICE General Conference 2006.
IEEE Std 802.16/2004 IEEE Standard for Local and metropolitan area networks, Part 16: Air Interface for Fixed Broadband Wireless Access Systems, IEEE Computer Society and the IEEE Microwave Theory and Techniques Society; Oct. 1, 2004.
IEEE Std 802-16e-2005 and IEEE Std 802.16/2004/Cor1-2005 IEEE Standard for Local and metropolitan area networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1, IEEE Computer Society and the IEEE Microwave Theory and Techniques Society; Feb. 28, 2006.
Japanese Notice of Ground(s) of Rejection dated May 17, 2011 for application No. 2008-540847.
Non-final Office Action dated May 17, 2012 issued in U.S. Appl. No. 12/429,340.
Japanese Office Action dated Feb. 2, 2012 in the counterpart Japanese patent application No. 2008-540847.
Tzu-Ming Lin et al., "Modification for enabling RS operations," IEEE C80216mmr-05_029r2, Nov. 2005.
Kenji Saito et al., "A proxy request method for IEEE802.16 relayed temninal", Proceedings of the 2006 IEICE General Conference Telecommunications 1, Mar. 8, 2006, pp. 491 (B-5-138).
Japanese Patent Office Decision of Rejection dated Sep. 11, 2012 in relation to Japanese Patent Application No. 2008-540847.
Final Office Action dated Aug. 13, 2012 received in U.S. Appl. No. 12/429,340.
Non-final Office Action dated Jul. 11, 2013 received in U.S. Appl. No. 12/429,340.
Notice of Allowance dated Nov. 13, 2013 received in U.S. Appl. No. 12/429,340.
Notification of the First Office Action dated Nov. 19, 2013 received in Chinese Patent Application No. 201110421575.7.

FIG. 7

| RS ID | Message type | Frame number | Number of BW request codes |
|---|---|---|---|

FIG. 12

| RS ID | Message type | Frame number | Number of ranging codes |
|---|---|---|---|

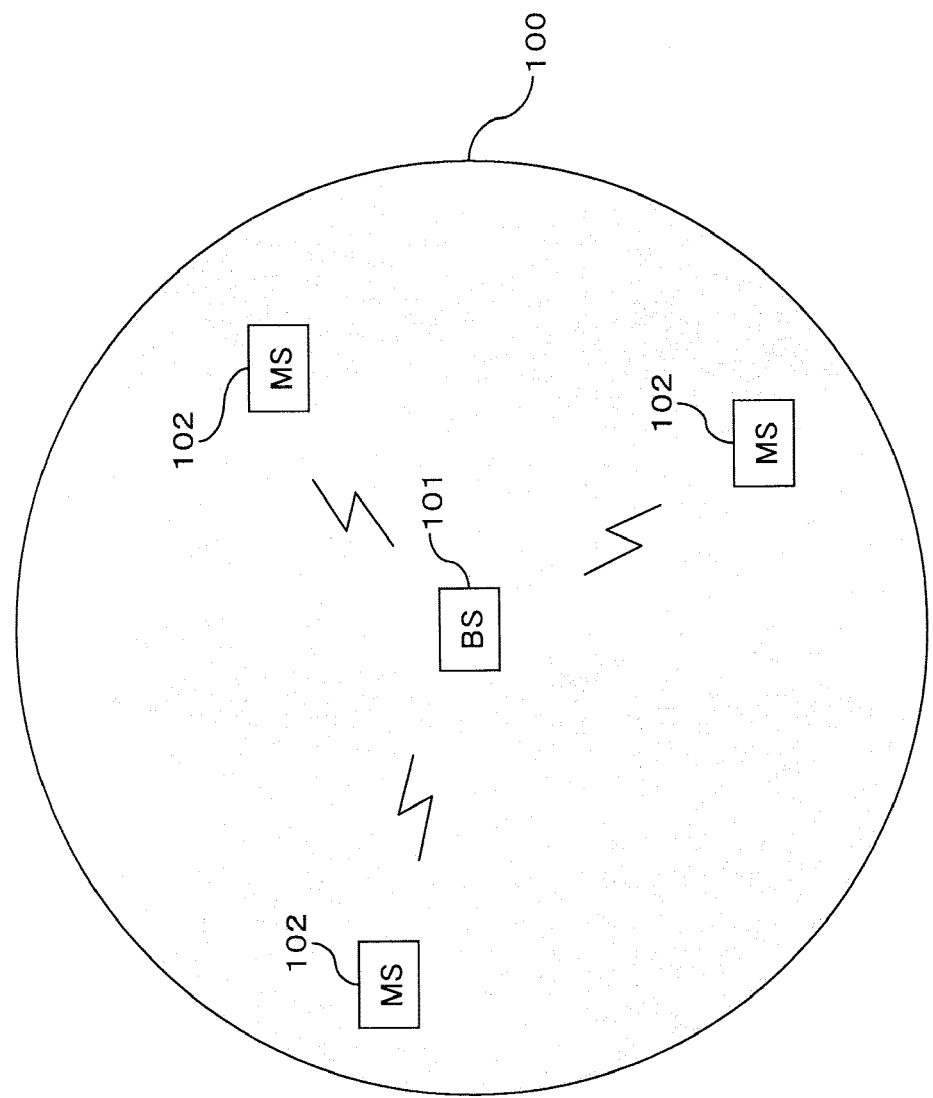

RELAY STATION AND RADIO COMMUNICATION SYSTEM

CROSS REFERENCE

This application is a divisional of U.S. patent application Ser. No. 12/429,340, filed Apr. 24, 2009, which is a continuation of PCT Application PCT/JP2006/321299 filed on Oct. 25, 2006, the entire contents of both of which are incorporated herein by reference.

TECHNICAL FIELD

The present invention relates to a radio base station, a relay station, a radio communication system and a radio communication method which utilize radio communication, and particularly relates to a technique suitable for use with, for example, a system prescribed by the IEEE 802.16.

BACKGROUND ART

At present, a radio communication system wherein communication is carried out through a radio communication path as represented by a system of WCDMA, CDMA2000 or the like is used popularly in the world. In such a radio communication system as just described, a radio base station (BS; Base Station) is provided in a service area such that a radio terminal carries out communication with a different communication apparatus (communication terminal) through the radio base station.

FIG. 18 shows a connection scheme of the P-MP (Point to Multipoint) type wherein a radio base station 101 connects to a plurality of radio terminals (MS; Mobile Stations) 102 in a cover area (cell) 100 thereof. In the IEEE (The Institute of Electrical and Electronics Engineers, Inc.) 802.16 which is the standards of high-speed radio data communication, such a P-MP scheme as shown in FIG. 18 is prescribed as a form of communication. Further, in the IEEE 802.16 WG, principally two kinds of specifications including the 802.16d specifications (802.16-2004) for point-to-point communication applications and the 802.16e specifications (802.16e-2005) for mobile communication applications are prescribed.

In such a P-MP type connection scheme as shown in FIG. 18, since the service area is limited to the inside of the cell 100 of the radio base station 101 and the radio environment is not good on the boundary (cell edge) of the cell 100, high-speed communication is in most cases difficult.

In order to solve this problem, the IEEE 802.16 WG establishes a task group 802.16j for developing a specification of a relay system where a relay station (RS; Relay Station) carries out relay between a radio base station and a radio terminal, and the working of the task group is proceeding at present.

It is to be noted that matters relating to the IEEE 802.16 described above are disclosed, for example, in Non-Patent Documents 1 to 3 listed hereinbelow.

Further, a technique is disclosed in Patent Document 1 listed hereinbelow wherein, in a relay system through a relay station, a radio base station decides scheduling in communication between a relay station and a radio terminal, and the relay station receives scheduling information between the relay station and the radio terminal from the radio base station and executes communication control between the relay station and the radio terminal based on the scheduling information. At this time, since the scheduling process is executed in a concentrated manner by the radio base station, it is sufficient for the relay station to have an easy implementation.

In the technique disclosed in Patent Document 1, where the overall scheduling in communication between the relay station and the radio terminal is carried out by the radio base station, it becomes necessary for the relay station to relay a signal and data received from the radio terminal to the radio station without changing the contents of the signal and the data. This is because the information of the radio terminal received by the relay station is required by the radio base station in order that the radio base station carries out, in place of the relay station, scheduling between the relay station and the radio terminal.

Non-Patent Document 1: IEEE Std802.16-2004
Non-Patent Document 2: IEEE Std802.16e-2005
Non-Patent Document 3: 2006 Comprehensive Meeting of The Japan Society of Information and Communication Research B-5-140 "Effects of the multiple MAP (map) in the IEEE 802.16 relay system"
Patent Document 1: Japanese Patent Laid-Open No. 2006-74325

DISCLOSURE OF THE INVENTION

Subject to Be Solved by the Invention

According to the background art described above, a radio terminal can carry out radio communication with a radio base station directly or through a relay station.

However, since information of the radio terminal received by the relay station is required by the radio base station in order for the radio base station to carry out scheduling between the relay station and the radio terminal in place of the relay station, consumption of a band which is a radio communication resource increases.

Therefore, it is one of objects of the present invention to achieve effective utilization of a radio communication resource.

It is to be noted that, in addition to the object described above, also it shall be understood as another one of objects of the present invention to achieve such effects as are provided by the constitutions indicated by the best mode for carrying out the present invention hereinafter described but are not achieved by the conventional techniques.

Means for Solving the Subject (1) In order to attain the object described above, according to an aspect of the present invention, there is provided a relay station which relays a signal to be transferred between a radio base station and a radio terminal, the relay station including a storage section adapted to store communication controlling information for communication control with the radio terminal, a base station side signal reception section adapted to receive, from the radio base station, scheduling information in communication between the relay station and the radio terminal, a complementation section adapted to complement contents of the scheduling information received by the base station side signal reception section in accordance with the communication controlling information stored in the storage section, and a terminal side signal transmission section adapted to transmit the scheduling information whose contents are complemented by the complementation section to the radio terminal.

(2) Preferably, the relay station further includes a terminal side signal reception section adapted to receive a signal and a message from the radio terminal and store information of the received signal and message into the storage section, an intensive collection section adapted to intensively collect the information of the signal and message from the radio terminal, and a base station side signal transmission section adapted to transmit the information intensively collected by the intensive collection section to the radio base station in order to produce the scheduling information.

(3) In this instance, preferably the terminal side signal reception section receives signals and messages from a plurality of radio terminals and stores information of the received signals and messages as the communication controlling information into the storage section; the intensive collection section intensively collects the information of the signals and messages from the plural radio terminals into one piece of information; and the complementation section complements the contents of the scheduling information received by the base station side signal reception section in an associated relationship with communication controlling information of each of the plural radio terminals in accordance with the communication controlling information stored in the storage section.

(4) Or, the relay station may be configured such that the terminal side signal reception section receives band request signals from the radio terminals and stores, as the communication controlling information, kind information of the band request signals and position information of the band request signals in a terminal transmission region as information of the received band request signals into the storage section, the intensive collection section intensively collects the information of the band request signals from the radio terminals, and the complementation section complements, regarding the scheduling information received by the reception section, the kind information of the band request signals and the position information of the band request signals in the terminal transmission region stored in the storage section.

(5) Or else, the relay station may be configured such that the terminal side signal reception section receives power/timing adjustment signals from the radio terminals and produces power/timing adjustment information for the corresponding radio terminals from the received power/timing adjustment signals and then stores kind information of the power/timing adjustment signals and position information in a terminal transmission region as the communication controlling information into the storage section together with the produced power/timing adjustment information, the intensive collection section collects information of the power/timing adjustment signals from a plurality of the radio terminals, the complementation section complements, regarding the scheduling information and messages received by the reception section, the kind information of the power/timing adjustment signals and the position information of the power/timing adjustment signals in the terminal transmission region stored in the storage section, and the terminal side signal transmission section transmits the power/timing adjustment information corresponding to the power/timing adjustment signals stored in the storage section to the radio terminals together with the scheduling information whose contents are complemented by the complementation section.

(6) Further, according to another aspect of the present invention, there is provided a relay station which relays a signal to be transferred between a radio base station and a radio terminal, the relay station including a terminal side reception section adapted to receive information of a signal and a message transmitted from the radio terminal, a decision section adapted to decide based on the information received by the terminal side reception section whether or not a notification of the information relating to the signal and the message received from the radio terminal is to be issued to the radio base station, and a notification section adapted to issue the notification of the relating information to the radio base station when it is decided by the decision section that the notification of the information relating to the signal and message received from the radio terminal is to be issued to the radio base station.

(7) Preferably, the relay station of (6) described above may be configured such that the terminal side reception section receives information of a signal and a message relating to a radio channel state between the relay station and the radio terminal transmitted from the radio terminal; the decision section decides, based on the information relating to the radio channel state between the relay station and the radio terminal received by the reception section, that a notification of the relating information is to be issued to the radio base station when a radio communication method used between the relay station and the radio terminal need to be changed; and the notification section issues, when it is decided by the decision section that the radio communication method need to be changed, a notification of at least one of the radio channel information and the radio communication method between the relay station and the radio terminal as a notification of the relating information to the radio base station.

(8) According to a further aspect of the present invention, there is provided a radio base station for transmitting and receiving a signal to and from a radio terminal through the relay station in (2), the radio base station comprising a reception section adapted to receive information from the base station side signal transmission section of the relay station, a scheduling information production section adapted to produce the scheduling information except for information to be complemented by the complementation section of the relay station based on the information received by the reception section, and a transmission section adapted to transmit the scheduling information produced by the scheduling information production section to the relay station.

(9) According to a still further aspect of the present invention, there is provided a radio base station for transmitting and receiving a signal to and from radio terminals through the relay station in (4), the radio base station comprising a reception section adapted to receive information from the base station side signal transmission section of the relay station, a scheduling information production section adapted to carry out band allocation by the number equal to the number of band request signals intensively collected in the information received by the reception section and produce the scheduling information based on the information received by the reception section, and a transmission section adapted to transmit the scheduling information produced by the scheduling information production section to the relay station.

(10) According to a yet further aspect of the present invention, there is provided a radio base station for transmitting and receiving a signal to and from a radio terminal through the relay station in (5), the radio base station including a reception section adapted to receive information from the base station side signal transmission section of the relay station, a scheduling information production section adapted to produce the scheduling information for which band allocation by the number equal to the number of power/timing adjustment signals intensively collected in the received information is carried out based on the information received by the reception section, and a transmission section adapted to transmit the scheduling information produced by the scheduling information production section to the relay station.

(11) According to a yet aspect of the present invention, there is provided a radio communication system comprising radio terminals, a radio base station for transmitting and receiving signals to and from the radio terminals, and a relay station for relaying a signal to be transferred between the radio terminals and the radio base station, the relay station including a terminal side signal reception section adapted to receive signals and messages from the radio terminal, a storage section adapted to store information of the signals and messages received by the terminal side reception section as communication controlling information for communication control between the radio terminals and the relay station, an intensive collection section adapted to intensively collect the information of the signals and the messages from the radio terminals, and a base station side transmission section adapted to transmit the information intensively collected by the intensive collection section to the radio base station, the radio base station comprising a reception section adapted to receive information from the base station side signal transmission section, a scheduling information production section adapted to produce scheduling information in communication between the relay station and the radio terminals except for information to be complemented by the complementation section of the relay station based on the information received by the reception section of the relay station, and a transmission section adapted to transmit the scheduling information produced by the scheduling information production section to the relay station, the relay station further including a base station side signal reception section adapted to receive the scheduling information from the radio base station, a complementation section adapted to complement contents of the scheduling information received by the base station side signal reception section in accordance with the communication controlling information stored in the storage section, and a terminal side signal transmission section adapted to transmit the scheduling information whose contents are complemented by the complementation section to the radio terminals.

(12) According to a yet further aspect of the present invention, there is provided a radio communication system comprising a radio terminal, a radio base station for transmitting and receiving a signal to and from the radio terminal, and a relay station for relaying a signal transferred between the radio terminal and the radio base station, the relay station including a radio channel state reception section adapted to receive information of a signal and a message relating to a radio channel state between the relay station and the radio terminal from the radio terminal, a decision section adapted to decide based on the information received by the channel state reception section whether or not a radio communication method used between the relay station and the radio terminal needs to be changed, and a notification section adapted to issue, when it is decided by the decision section that the radio communication method needs to be changed, a notification of at least one of radio channel information and the radio communication method between the relay station and the radio terminal as relating information to the radio base station, the radio base station comprising a scheduling information production section adapted to change a radio communication method to be used between the radio base station and the radio terminal through the relay station and produce scheduling information in communication wherein the radio communication method is changed based on the relating information issued from the notification section, and a transmission section adapted to transmit the scheduling information produced by the scheduling information production section to the relay station.

(13) It is to be noted that, in the radio communication system of (12) described above, the radio communication method which is a target of the change may include a modulation method, a coding method and a coding ratio as elements thereof.

(14) Further, according to a yet aspect of the present of the present invention, there is provided a radio communication method by a plurality of radio terminals, a radio base station for transmitting and receiving signals to and from the radio terminals and a relay station for relaying a signal to be transferred between the radio terminals and the radio base station, the method including, in the relay station, receiving signals and messages from the radio terminals, storing information of the received signals and messages as communication controlling information for communication control between the radio terminals and the relay station, intensively collecting the information of the signals and messages from the radio terminals, and transmitting the intensively collected information to the radio base station, in the radio base station, receiving the intensively collected information from the relay station, producing scheduling information for communication between the relay station and the individual radio terminals based on the received intensively collected information, and transmitting the scheduling information to the relay station, and, in the relay station, receiving the scheduling information transmitted from the radio base station, complementing contents of the received scheduling information in accordance with the stored communication controlling information, and transmitting the scheduling information whose contents are complemented to the radio terminals.

(15) According to a yet aspect of the present invention, there is provided a relay station interposed between a radio base station and radio terminals for carrying out a relay process, the relay station including a storage section adapted to store information obtained by reception of signals from the radio terminals, a notification section adapted to issue to the radio base station a notification of securing of a transmission region in an upward direction based on the received signal, a reception section adapted to receive transmission region information in the upward direction in the relay station secured by the radio base station in accordance with the notification, and a transmission section adapted to add contents to the transmission region information based on the information stored in the storage section and transmit the transmission region information to which the contents are added in a downward direction.

Effect of the Invention

In this manner, with the present invention, since scheduling information of the radio terminal can be complemented by the relay station, there is an advantage that effective utilization of radio communication resource can be achieved.

BRIEF DESCRIPTION OF THE DRAWINGS

FIG. 7 is a view illustrating an example of a configuration of a controlling message to be produced by a notification section of the relay station in the first embodiment.

FIG. 12 is a view illustrating an example of a configuration of a controlling message to be produced by a notification section of the relay station in the second embodiment.

FIG. 18 is a view illustrating a radio communication system.

Figure 1:
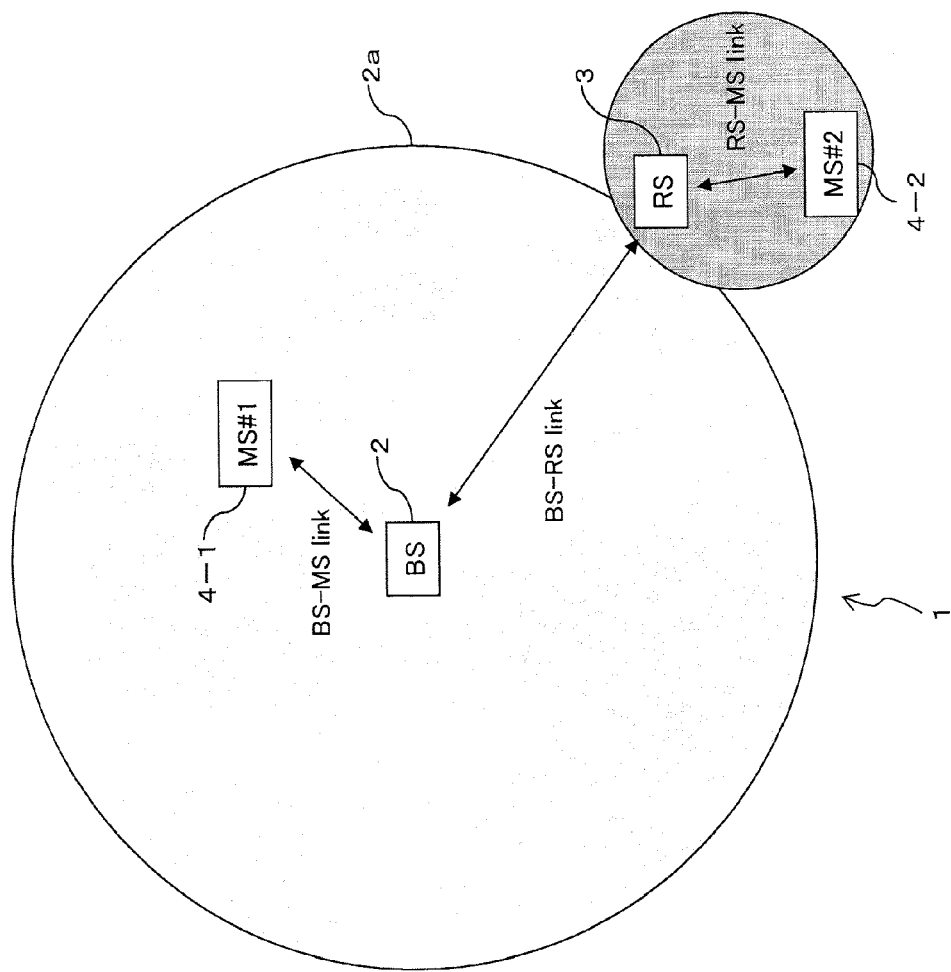
FIG. 1 is a view illustrating an example of a configuration of a radio communication system to which embodiments of the present invention are applied.

DESCRIPTION OF REFERENCE CHARACTERS 1 radio communication system
2, 2', 2A to 2C radio base station
2a cover area
3, 3', 3A to 3C relay station
4-1, 4-2, 4-21 to 4-23 radio terminal
100 cover area
101 radio base station
102 radio terminal
201, 211 reception section
202, 212 controlling message extraction section
203, 213 scheduling section
204, 214 NW interface section
205, 215 buffer section
206, 216 transmission section
301, 311, 321 reception section
302, 312, 322 Code reception section
303, 313, 323 storage section
304, 314 intensive collection section
305, 315, 325 notification section
306, 316, 326 transmission section
307 UL MAP (map) extraction section
308, 318 relay section
317 DL MAP (map) extraction section
324 decision section

BEST MODE FOR CARRYING OUT THE INVENTION

In the following, embodiments of the present invention are described with reference to the drawings.

[a] Description of an Example of the Configuration of the Radio Communication System to which the Embodiments are Applied FIG. 1 is a view illustrating an example of a configuration of a radio communication system to which the embodiments are applied. A radio communication system 1 illustrated in FIG. 1 includes a radio base station (BS) 2, a relay station (relay station; RS) 3, and a plurality of (here, two) radio terminals (MS#1, MS#2) 4-1 and 4-2. It is to be noted that, where the radio terminals 4-1 and 4-2 are not distinguished from each other in the following description, the radio terminal is referred to simply as radio terminal 4.

Then, the radio terminal 4-1 existing in a cover area 2a of the radio base station 2 can carry out transfer (communication) of a radio signal with the radio base station 2 (BS-MS link), and the radio terminal 4-2 outside the cover area 2a of the radio base station 2 can carry out radio communication with the radio base station 2 through the relay station 3 (BS-RS link and RS-MS link). It is to be noted that, as the radio terminal 4, not only an MS suitable for movement but also a radio apparatus suitable for utilization in a stationary state can be used.

Figure 2:
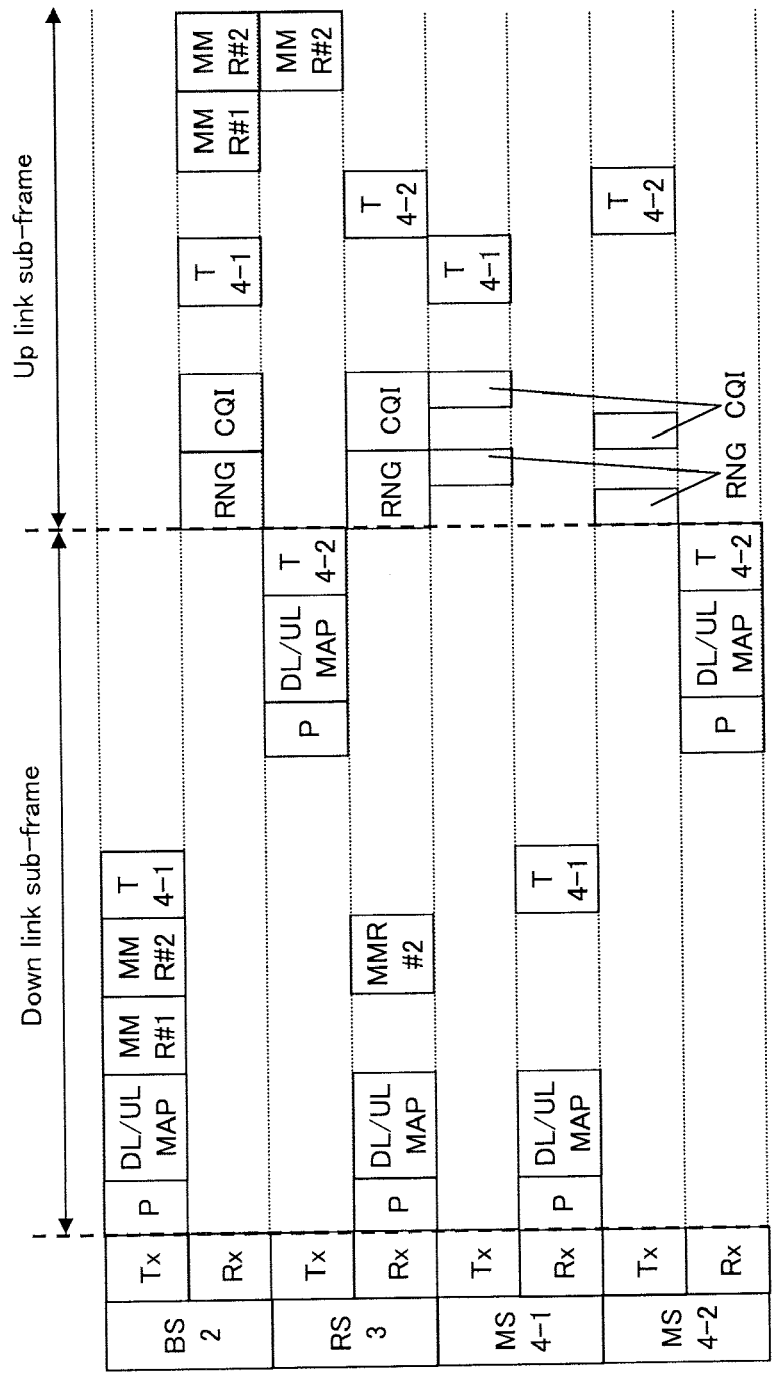
FIG. 2 is a view illustrating an example of a radio frame format to which the embodiments are applied.

A radio frame format for radio communication among the radio base station 2, relay station 3 and radio terminals 4-1 and 4-2 described above is illustrated as an example of a radio frame format to which the present embodiment is applied in FIG. 2. It is to be noted that, while a radio frame format ready for the IEEE Std802.16d,e is taken as an example here, the present invention is not limited to this.

In FIG. 2, reference characters Tx and Rx signify transmission and reception, respectively. Accordingly, the BS 2 transmits a DL/UL MAP (map), MMR bursts #1 and #2 and a downward burst T4-1 in order while using a preamble (P) as the top of the frame. It is to be noted that the MMR burst #1 is transmission data from the radio base station 2 to a relay station not shown in FIG. 1; the MMR burst #2 is transmission data to the relay station 3 shown in FIG. 1; and the downward burst 4-1 is transmission data to the radio terminal 41 in FIG. 1.

The preamble (P) is a synchronizing signal to be transmitted to the inside of the area of the radio base station 2 to make it possible for the relay station 3 to be synchronized with the radio base station 2 and is transmitted as a predetermined known pattern in a fixed period. It is to be noted that, in FIG. 2, if an Up Link Sub-frame (up link sub-frame) ends, then transmission of a Down Link Sub-frame (down link sub-frame) is started again in order from the preamble.

The radio terminal 4 can store plural kinds of patterns of the preamble in advance such that a pattern whose reception quality (for example, reception level) is highest from among the patterns is selected as that of the radio base station 2 which is a communication destination.

Where, for example, OFDMA (Orthogonal Frequency Division Multiplexing Access) is utilized as a radio method, while the radio base station 2 allocates the transmission data to different sub carriers and the plural sub carriers are used to carry out transmission, also the preamble can be al located to the sub carriers with a predetermined pattern and transmitted. The radio terminal 4 can receive a combination of predetermined sub carriers to carry out matching with the known preamble signal so as to establish synchronism with the radio base station 2 which transmits the best preamble.

The DL/UL MAP (map) is transmitted subsequently to the transmission of the preamble of the Down Link Sub-frame (down link sub frame) and is controlling data for controlling transmission and reception operation of transmission and reception timings, transmission and reception channels, a radio communication method (modulation method, coding method, coding rate or the like) and is so forth with regard to the relay station 3 and the radio terminal 4-1. The MAP (map) data includes DL MAP (map) data and UL MAP (map) data, and the DL MAP (map) data defines a structure of a downward sub frame and the UL MAP (map) data defines a structure of an upward sub frame.

The DL MAP (map) data includes data for the notification of a transmission timing and a transmission channel (a reception timing and a reception channel to the reception side), a radio communication method and so forth regarding a region of the MMR #2 which is the transmission data to the relay station 3 (including MAP (map) data, transmission data and so forth destined for the radio terminal 4-2) and data for the notification of a transmission timing and a transmission channel (a reception timing and a reception channel to the reception side), a radio communication method and so forth regarding the region of the T4-1 which is the transmission data for the radio terminal 4-1. It is to be noted that also the controlling data in a region of the MMR #1 in FIG. 2 which is the transmission data to the relay station not shown in FIG. 1 is included in the DL MAP (map).

On the other hand, the UL MAP (map) data includes MAP (map) data for the notification of a region (a reception timing and a reception channel (a transmission timing and a transmission channel to the transmission side)) for receiving an RNG (Ranging (ranging) signal) and a CQI (Channel Quality Indicator) from the radio terminal 4, a radio communication method and so forth, and MAP (map) data for the notification of a region (a reception timing and a reception channel (a transmission timing and a transmission channel to the transmission side)) for receiving the MMR #2 (MMR #1 from a relay station not shown) from the relay station 3, a radio communication method and so forth.

Here, the Ranging (ranging) signal is a known signal and is received by the radio station 2 (or by the radio base station 2 through the relay station 3). The radio station 2 which receives the ranging signal reports a result obtained by determining not only a difference of a reception timing (phase shift) and a difference of a reception frequency but also information of increase or decrease of required transmission power as Adjustment (adjustment) information to the radio base station 2. In this example, the RNG from the radio terminal 4-1 is directly received within an RNG reception period of the radio base station 2 and the RNG from the radio terminal 4-2 is received within an RNG reception period of the relay station 3, and the RNGs are transmitted to the radio base station 2 through the MMR #2 of an upward link.

The CQI indicates a transmission period for reporting a result obtained by carrying out measurement of the reception quality such as a CINR (Career to Interference and Noise Ratio) or the like for a known signal such as a preamble, a pilot signal (known signal included in downward burst data or the like) or the like by the radio terminal 4. The radio base station 2 changes transmission parameters such as a modulation method, a coding method, a coding rate and so forth, for example, based on the CQI information received from the radio terminal 4-1 under the radio base station 2 itself.

In particular, control in a direction in which the transmission speed is raised is carried out where the reception quality is good, but control in another direction in which the transmission speed is lowered is carried out where the reception quality is degraded.

Incidentally, the relay station 3 transmits the preamble and the DL/UL MAP (map) in order to provide a service to the radio terminal 4-2 outside the area where the radio base station 2 forms such as a radio terminal 4-2 shown in FIG. 1. In particular, since the radio terminal 4-2 cannot receive the preamble and so forth transmitted from the radio base station 2, by receiving the preamble and so forth transmitted from the relay station 3, the radio terminal 4-2 can be synchronized with a radio frame transmitted from the relay station 3. It is to be noted that, as the preamble transmitted from the relay station 3, not only a preamble same as that transmitted from the radio base station 2 but also another preamble different from that transmitted from the radio base station 2 may be used.

The DL/UL MAP (map) transmitted from the relay station 3 defines a region (transmission and reception timings and channels) and a radio communication method for carrying out radio communication with the radio terminal 4-2 under the relay station 3 and originates from the data transmitted with the MMR #2 of the downward link, and the DL/UL MAP (map) can be set so as to have contents different from those of the DL/UL MAP (map) transmitted from the radio base station 2.

Accordingly, since the radio terminal 4-2 receives the preamble (P) transmitted from the relay station 3 to establish synchronization and the DL MAP (map) to detect the transmission region and the radio communication method of the downward burst T4-2, the radio terminal 4-2 receives the burst T4-2 with the region and the radio communication method. Similarly, the radio terminal 4-2 acquires the transmission region and the radio communication method of the RNG, CQI and T4-2 included in the received UL MAP (map).

Then, the relay station 3 receives the RNG, CQI and T4-2 in accordance with the notified UL MAP (map) and transmits the received data to the radio base station 2 through the MMR #2 of the upward link.

In this manner, while the radio communication of the radio terminal 4-2 can be supported by installing the relay station 3, the radio base station 2 receives, in order to produce not only the DL/UL MAP (map) for the communication with the radio terminal 4-1 and the relay station 3 but also the DL/UL MAP (map) for the radio terminal 4-2, the information of the radio terminal 4-2 received by the relay station 3.

In the present embodiment, the information amount to be transmitted by the MMRs #2 of the upward/downward links between the relay station 3 and the radio base station 2 can be suppressed.

[b] Description of the First Embodiment

Outline of a Signal Sequence in the First Embodiment

Figure 3:
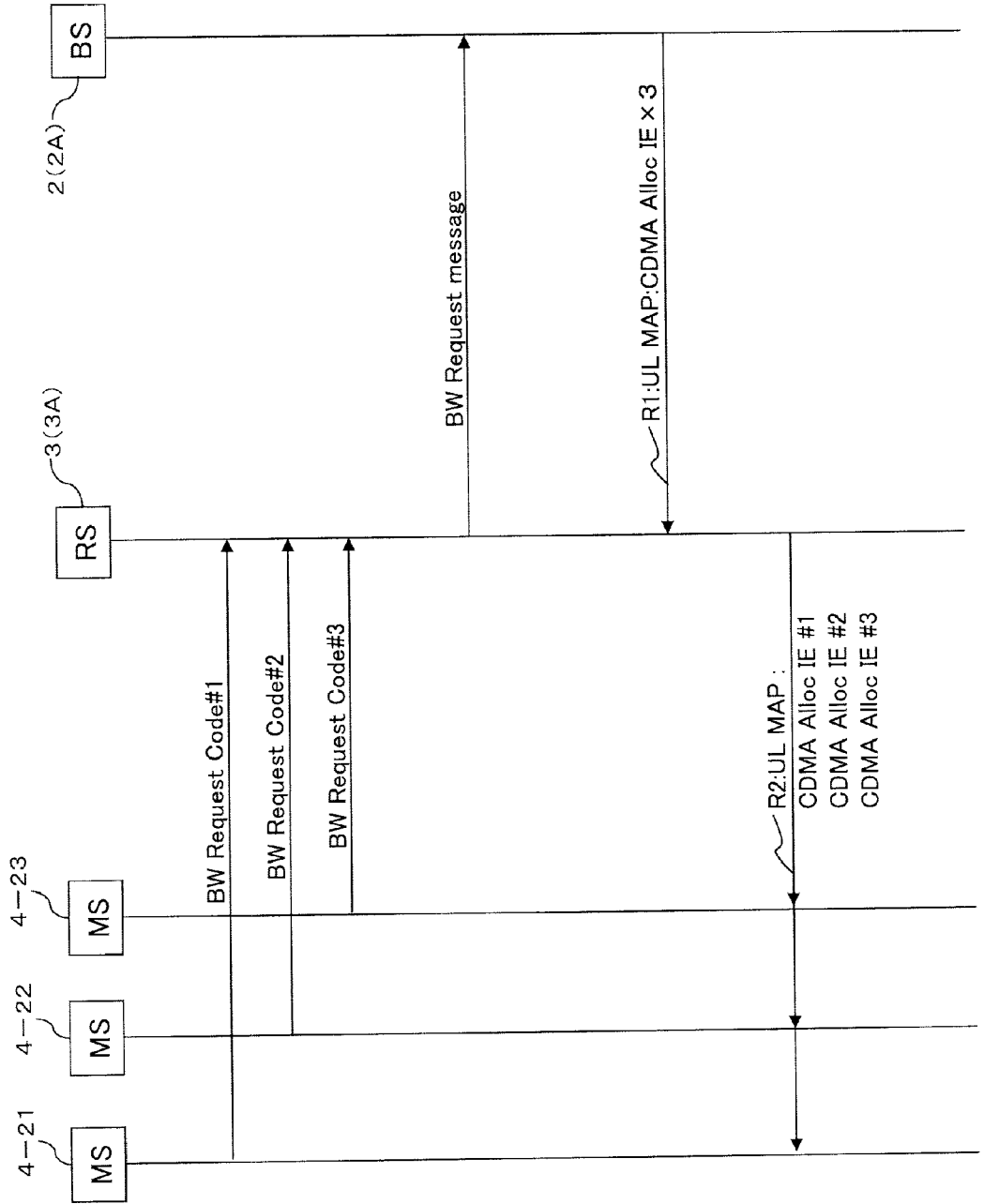
FIG. 3 is a view illustrating a signal sequence in a first embodiment of the present invention.
Figure 4:
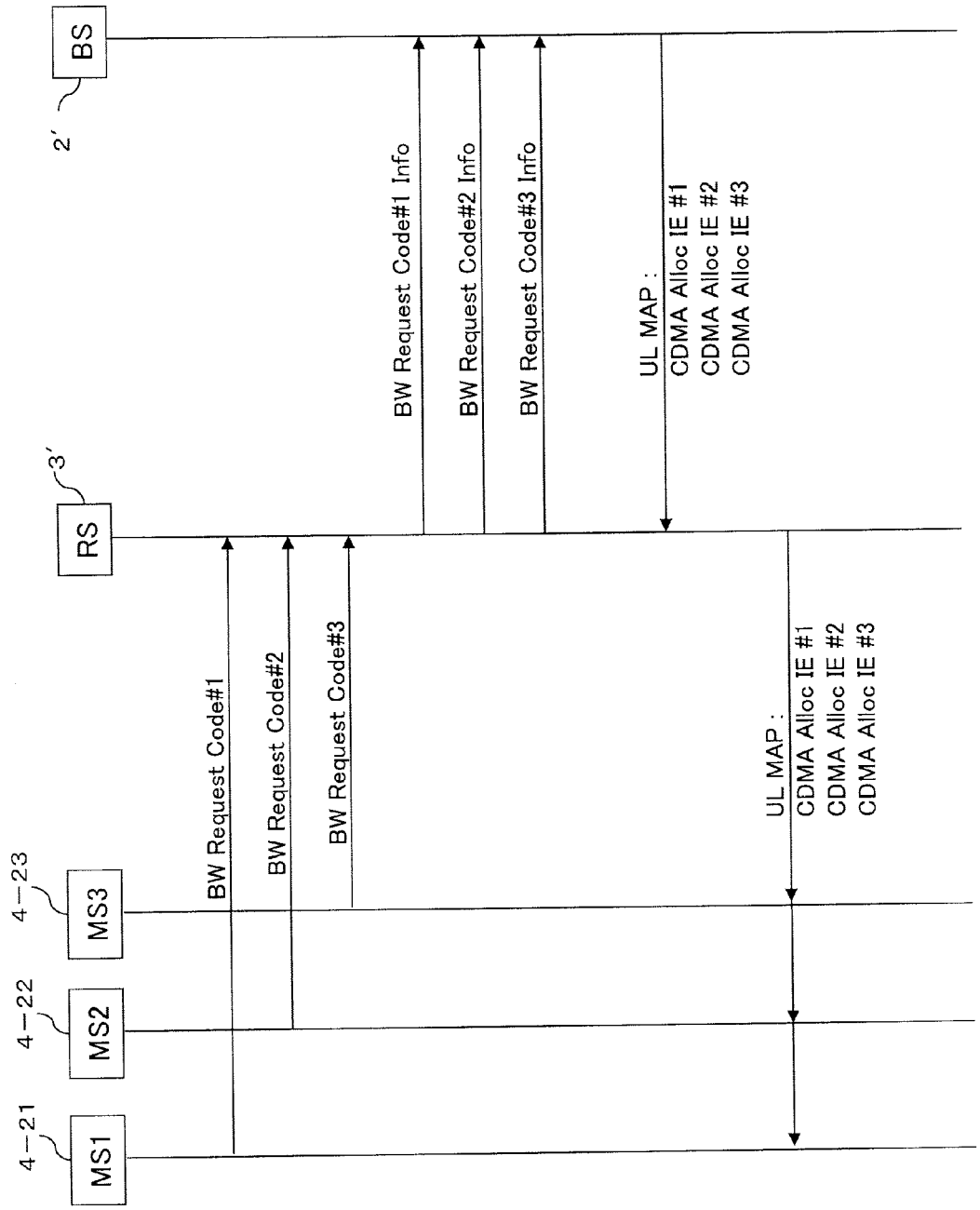
FIG. 4 is a view illustrating a signal sequence as a comparative example to the signal sequence of the first embodiment.

FIG. 3 is a view illustrating a signal sequence regarding a BW Request Code (request code) and a response signal to the request code signaled from the radio base station 2 according to the first embodiment of the present invention, and FIG. 4 is a view illustrating a signal sequence as a comparative example to the signal sequence of the first embodiment. It is to be noted that, in FIGS. 3 and 4, it is assumed that the relay stations 3 and 3' are individually connected to three radio terminals 4-21 to 4-23.

It is to be noted that the BW Request Code (request code) is a code to be transmitted, when data should be transmitted from the radio terminal 4 to the network, at first from the radio terminal 4 to the radio base station 2 (through the relay station 3' in FIG. 4 or the relay station 3 in FIG. 3), for example, in the RNG region of the upward link in FIG. 2. The radio terminal selects one of plural kinds of codes and transmits the selected code. Then, a CDMA Allocation (allocation) IE which is a response to the BW Request Code (request code) is information defined in the UL MAP (map) and is used for the notification of a frame region (transmission and reception timings) and a communication method for signaling the BW Request from the radio terminal 4, to the radio terminal 4 which transmitted the BW Request Code (request code). The radio terminal 4 which receives the CDMA Allocation (allocation)

IE can transmit the BW Request which is a band request for transmitting data to the network with the frame region (transmission timing) and the communication method designated by the CDMA Allocation (allocation) IE, to the radio base station 2.

Here, in order for the radio base station 2 to carry out band allocation corresponding to the BW Request Code (request code) through the UL MAP (map) as in the relay station 3' shown in FIG. 4, it is supposed that, when BW Request Codes (request codes) #1 to #3 are received from the plural radio terminal 4-21 to 4-23, it becomes necessary upon every reception to relay information (for example, the kind of the code) of the BW Request Codes (request codes) to the radio base station 2 together with information of the reception timings (frame number, frame position).

In particular, the radio base station 2' shown in FIG. 4 receives the information relating to the BW Request Code (request code) every time, and produce scheduling information (DL/UL MAP (map)) including responses (CDMA Allocation (allocation) IEs (Information Elements); which are described each as CDMA Alloc IE in FIG. 4) to the BW Request Codes (request codes).

On the other hand, with the relay station 3 according to the first embodiment shown in FIG. 3, in order to produce scheduling information in the radio base station 2 where the BW Request Codes (request codes) #1 to #3 are received from the radio terminals 4-21 to 4-23, respectively, information intensively collected rather than all information in the case of FIG. 4 is transmitted as a single BW Request Message (request message) to the radio base station 2 without transmitting all information of the BW Request Codes (request codes) #1 to #3 including the information of the reception timings (that is, information of the transmission timings from the radio terminal).

In particular, when the BW Request Codes (request codes) #1 to #3 are received from the plural connected radio terminals 4-21 to 4-23, respectively, the relay station 3 stores the BW Request Codes (request codes) #1 to #3 and information of the reception position of the BW Request Codes (request codes) in radio frames (information obtained by reception of signals from the radio terminals). Then, the relay station 3 transmits, as information obtained by intensively collecting the information of the BW Request Codes (request codes), for example, not patterns of the received BW Request Codes (request codes) themselves but information of the number of the received BW Request Codes (request codes) as the BW Request Message (request message) to the radio base station 2. It is to be noted that transmission of the information of the reception timings of the BW Request Codes (request codes) #1 to #3 stored by the relay station 3 itself to the radio base station 2 is omitted.

The radio base station 2 secures the number of regions for CDMA Allocation (allocation) IEs equal to the number of the BW Request Codes (request codes) received from the relay station 3 and produces the UL MAP (map). In particular, the radio base station 2 does not carry out the particular information of the reception frame position of the BW Request Code (request code) individually in the CDMA Allocation (allocation) IEx3 which are responses to the radio terminals 4-21 to 4-23 which transmitted the BW Request Codes (request codes) #1 to #3, respectively, but outputs a response R1 (CDMA Allocation (allocation) IE in the UL MAP (map)) representing that regions for the allocation are secured. Normally, while the value of the BW Request Codes (request codes) and the position of radio frames when the radio terminals 4-21 to 4-23 transmit the BW Request Codes (request codes) #1 to #3, respectively, are described in the CDMA Allocation (allocation) IE, since the radio base station 2 in the first embodiment does not grasp the information just described, the description of the information into the region is omitted.

In particular, the positions, which are to be written into the CDMA Allocation (allocation) IEs, of the radio frames when the radio terminals 4-21 to 4-23 transmit the BW Request Codes (request codes) #1 to #3, respectively, are stored in the relay station 3 as described above. Therefore, the relay station 3 writes the contents of the information stored therein into the CDMA Allocation (allocation) IE region in the UL MAPs (maps) from the radio base station 2 and allocates the frame positions of the BW Requests individually. It is to be noted that the priority degree of the allocation can be determined using the arrival order, the degree of importance or the like of the Codes as a scale.

The relay station 3 transmits the CDMA Allocation (allocation) IEs #1 to #3 as responses in which the frame positions of the BW Requests are allocated in this manner in the UL MAP (map) (refer to R2). The radio terminals 4-21 to 4-23 can read out the contents of the response CDMA Allocation (allocation) IEs #1 to #3 corresponding to the BW Request Codes (request codes) #1 to #3 transmitted from the radio terminals 4-21 to 4-23 themselves from the contents of the received UL MAPs (maps), respectively, so that each of them can obtain the frame position and the radio communication method designated for transmitting a later BW Request.

Consequently, the transmission amount of the information relating to the BW Request Code (request code) particularly from the relay station 3 to the radio base station 2 can be reduced and the MMR #2 which is a radio communication resource of the upward link can be effectively used.

Configuration of the Relay Station in the First Embodiment

Figure 5:
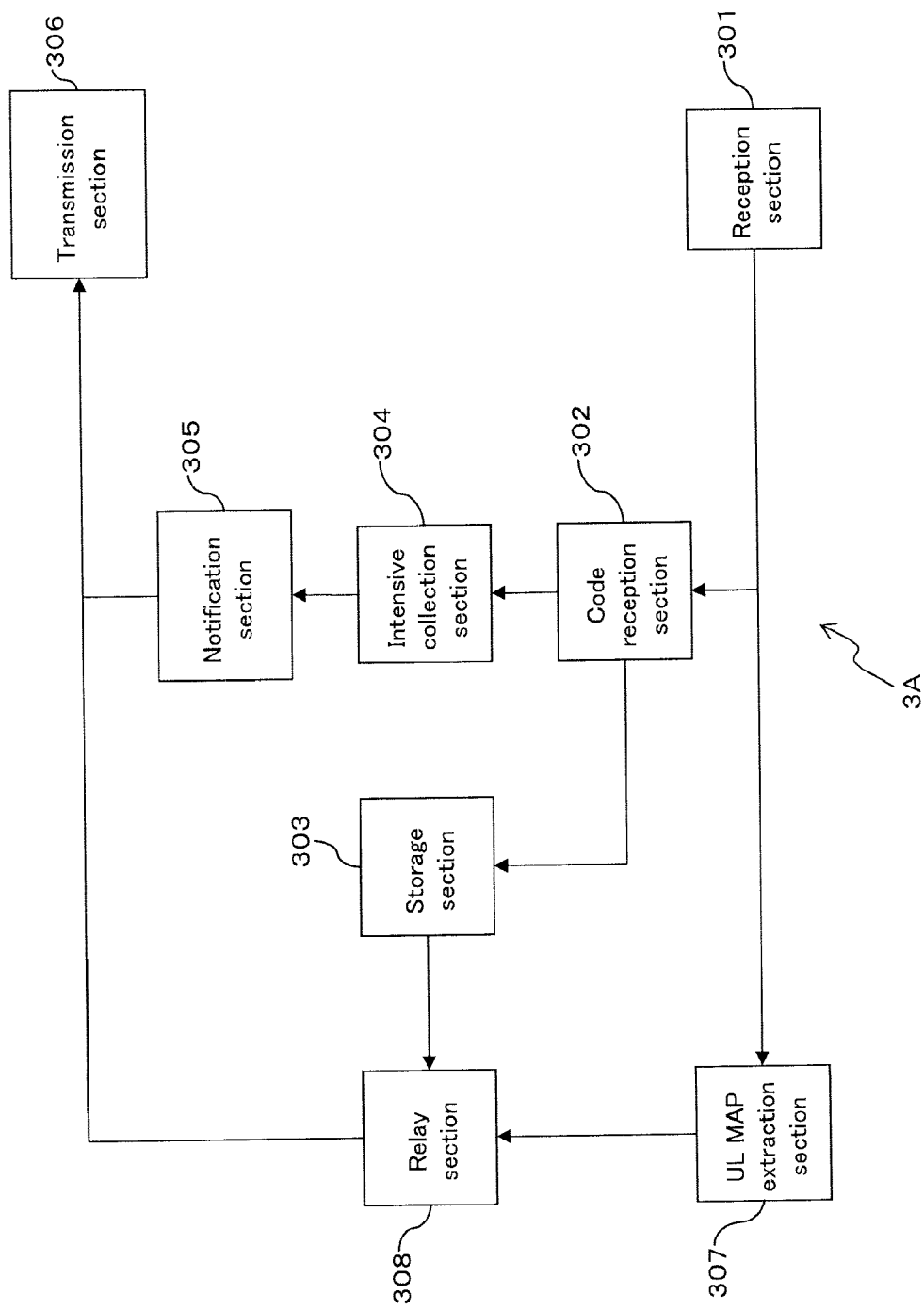
FIG. 5 is a block diagram showing a relay station in the first embodiment.

Taking notice of such a function for achieving enhancement of efficiency of a radio communication resource as described above, the relay station 3 in the first embodiment includes a reception section 301, a Code reception section 302, a storage section 303, an intensive collection section 304, a notification section 305, a transmission section 306, a UL MAP (map) extraction section 307 and a relay section 308 similarly to a relay station 3A shown in FIG. 5.

Here, the reception section 301 receives a signal or a radio signal which forms a message from the radio terminal 4-2 (refer to FIG. 1, radio terminals 4-21 to 4-23 in FIG. 3) and the radio base station 2. Further, the Code reception section 302 extracts a code (Code) like, for example, such a BW Request Code (request code) (band request signal) from the radio terminal 4-2 as described above from the signal or the message received by the reception section 301. In particular, information of a symbol (symbol) and a subchannel (subchannel) is detected as information of a frame number, a code value and a position of a radio frame when the code is received.

Accordingly, a terminal side signal reception section for receiving signals and messages from the plural radio terminals 4-21 to 4-23 and storing information of the received signals and messages into the storage section 303 is configured from the reception section 301 and the Code reception section 302 described above. Further, a base station side signal reception section for receiving scheduling information in communication between the radio base station 2A and the plural radio terminals 4 through the relay station 3A from the radio base station 2A is configured from the reception section 301 described above.

Figure 6:
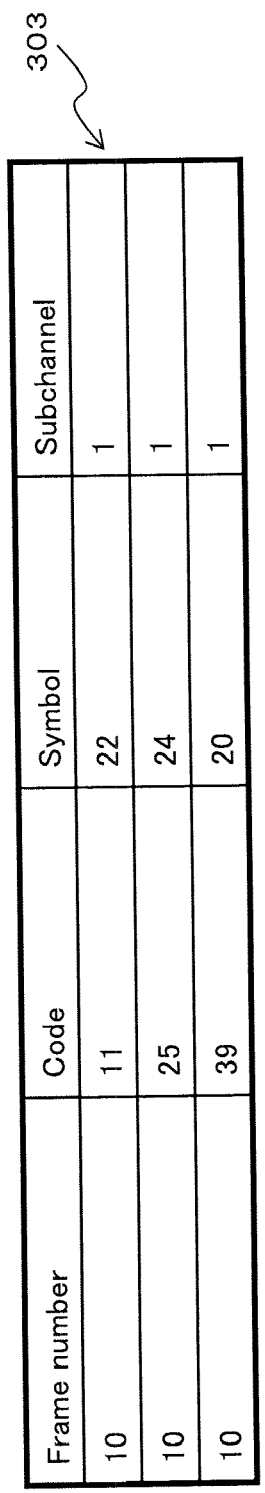
FIG. 6 is a view illustrating information to be stored by a storage section of the relay station in the first embodiment.

The storage section 303 stores the information of the signals and the messages from the plural radio terminals 4-21 to 4-23. In particular, as the information of the band request signal received by the Code reception section 302, information of the kind and the position of the band request signals is stored as communication controlling information by the storage section 302. For example, as shown in FIG. 6, the information of the code number and frame number extracted and detected by the Code reception section 302 and the symbol and the sub channel which are information of the position of the radio frame when the code is received is stored. Further, the storage section 303 stores the communication controlling information for controlling communication with the plural radio terminals 4-21 to 4-23 (in this instance, information for producing a DL/UL MAP (map) which is scheduling information).

The intensive collection section 304 intensively collects the information of the signals and the messages from the plural radio terminals 4-21 to 4-23. In particular, where such a BW Request Code (request code) from the radio terminal 4-2 as described above is received by the Code reception section 302, the number of such BW Request Codes (request codes) received in the frame is counted and information of the counted number of the BW Request Codes (request codes) is passed to the notification section 305 so as to be signaled as a controlling message to the radio base station 2A.

Consequently, the notification section 305 produces a controlling message based on the information of the number of the BW Request Codes (request codes) from the intensive collection section 304, and the transmission section 306 radio transmits the controlling message produced by the notification section 305 to the radio base station 2A. It is to be noted that a band for transmission of the controlling message is allocated by the radio base station 2A when the relay station 3A receives the BW Request Code (request code) from the radio terminal 4-2.

An example of a configuration of the controlling message to be produced by the notification section 305 is illustrated in FIG. 7. As illustrated in FIG. 7, ID information (RS ID) of the relay station 3A which is identification information of the transmission source, information of a kind (type) of the controlling message (Message Type), a frame number (Frame Number) when the relay station 3A receives the BW Request Code (request code) and a count value (No. BW Request Code) of the number of the BW Request Codes (request codes) at that time can be included in the controlling message.

Accordingly, a base station side signal transmission section for transmitting information intensively collected by the intensive collection section 304 to the radio base station 2A in order to produce a DL/UL MAP (map) which is scheduling information is composed from the notification section 305 and the transmission section 306 described above.

Further, the UL MAP (map) extraction section 307 extracts the UL MAP (map) from the signal received from the radio base station 2A by the reception section 301.

The CDMA Allocation (allocation) IE which is a response to the BW Request Code (request code) is included in the UL MAP (map). When the relay section 308 relays the UL MAP (map) extracted by the UL MAP (map) extraction section 307 to the radio terminal 4-2 through the transmission section 306, particularly the information of the CDMA Allocation (allocation) IE is converted into the information stored in the storage section 303

As described above, while the information of the position, frame number, code value and so forth of the radio frame when the radio terminals 4-21 to 4-23 transmit the BW Request Codes (request codes) #1 to #3 are stored into the storage section 303 of the relay station 3A, by the intensive collection process by the intensive collection section 304, the information stored in the storage section 303 is omitted from the contents (contents of the controlling message of FIG. 7) to be signaled to the radio base station 2A. Accordingly, the information just described is not included in the CDMA Allocation (allocation) IE included in the UL MAP (map) from the radio base station 2A.

The relay section 308 can write to complement the contents (information of the position, frame number, code value and so forth of the radio frame) stored in the storage section 303 into the region of the CDMA Allocation (allocation) IE in the UL MAP (map) extracted by the UL MAP (map) extraction section 307, and can individually allocate a frame position of a BW Request to be transmitted from the radio terminal 4-2. The CDMA Allocation (allocation) IE whose contents are complemented in this manner can be transmitted to the radio terminal 4 through the transmission section 306. It is to be noted that the priority degree of the allocation can be determined using the arrival order of the Codes, the degree of importance or the like as a scale.

Accordingly, a complementation section for complementing the contents of the scheduling information (from the radio base station 2A) received by the reception section 301 in accordance with the communication controlling information stored in the storage section 303 is configured by the relay section 308 described above. In particular, the relay section 308 as the complementation section complements the kind of the band request signal and the position information stored in the storage section 303 regarding the scheduling information received by the reception section 301.

Further, the transmission section 306 configures a terminal side signal transmission section for transmitting the scheduling information whose contents are complemented by the relay section 308 to the plural radio terminals 4-21 to 4-23.

Configuration of the Radio Base Station 2A in the First Embodiment

Figure 8:
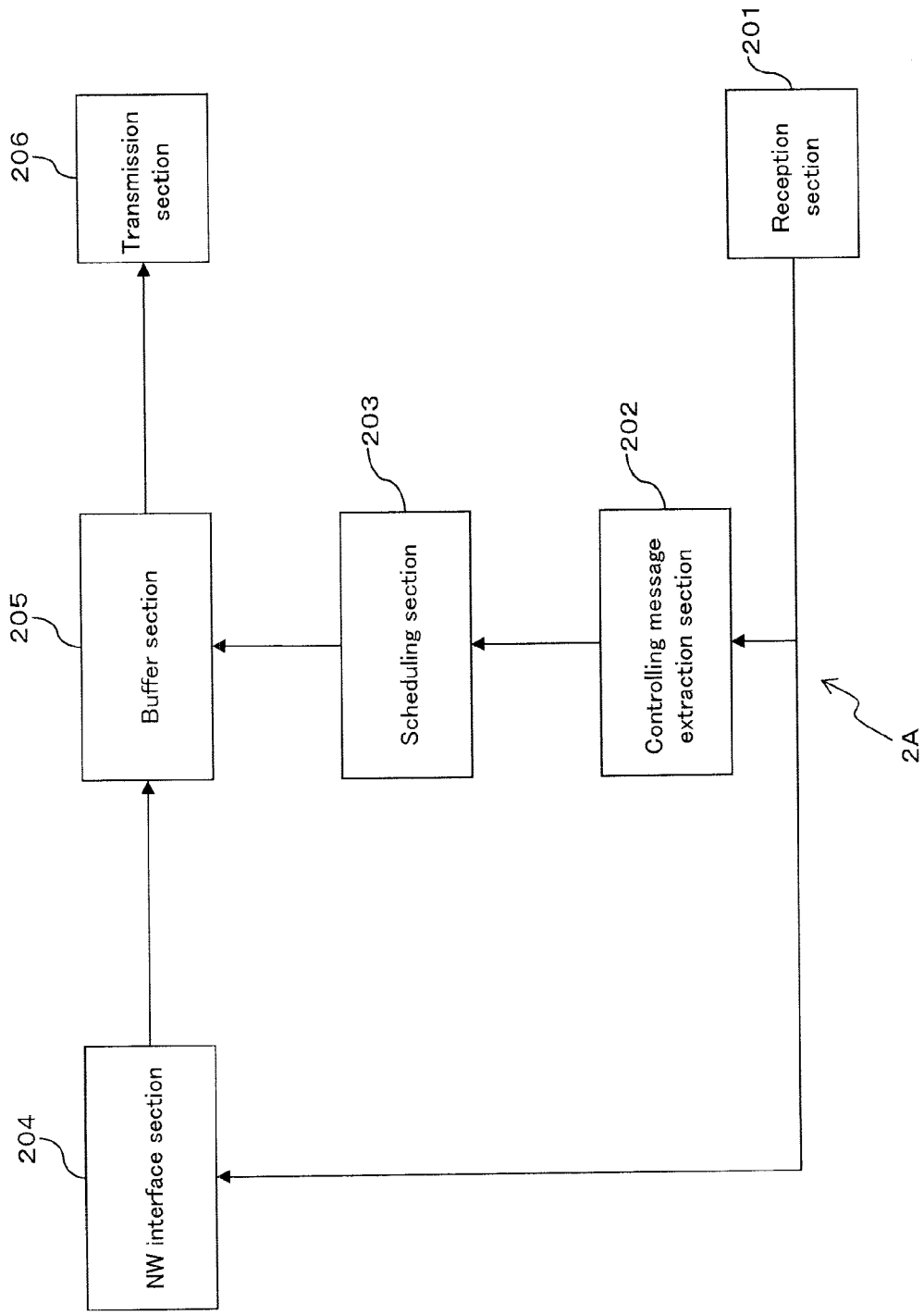
FIG. 8 is a block diagram illustrating a radio base station in the first embodiment.

Further, taking notice of the function for achieving enhancement of the efficiency of such a communication resource as described above, the radio base station 2A in the first embodiment includes a reception section 201, a controlling message extraction section 202, a scheduling section 203, an NW interface section 204, a buffer section 205 and a transmission section 206 as shown in FIG. 8.

Here, the reception section 201 receives a radio signal which configures a signal or a message from the relay station 3A or the radio terminal 4-1 (refer to FIG. 1). Further, the controlling message extraction section 202 extracts information of the controlling message from the signal or the message received by the reception section 201. For example, the controlling message extraction section 202 extracts contents of the controlling message for the notification of the number of such BW Request Codes (request codes) received by the relay station 3A as illustrated in FIG. 7.

The scheduling section 203 produces a DL/UL MAP (map) which is the scheduling information from the contents described in the controlling message extracted by the controlling message extraction section 202. For example, where such a controlling message for the notification of the number of the BW Request Codes (request codes) as illustrated in FIG. 7 is extracted by the controlling message extraction section 202, the scheduling section 203 produces CDMA Allocation (allocation) IEs for the number of regions equal to the number of the BW Request Codes (request codes) and adds the produced CDMA Allocation (allocation) IEs to the UL MAP (map). At this time, the produced CDMA Allocation (allocation) IE does not include particular information which configures a response to the BW Request Codes (request codes).

Accordingly, the scheduling section 203 described above functions as a scheduling information production section for producing a DL/UL MAP (map) which is the scheduling information based on the information received by the reception section 201 except for information to be complemented by the relay section 308 of the relay station 3A described above. In other words, the scheduling section 203 carries out, based on the information received by the reception section 201, allocation of the number of bands equal to the number of band request signals intensively collected in the information received by the reception section 201 to produce scheduling information.

The NW interface section 204 carries out an interface process for signaling the data from the radio terminal 4 received by the reception section 201, for example, to a different network, and carries out another interface process for a signal destined for the radio terminal 4 from the different network. Further, the buffer section 205 carries out buffering to transmit the data from the NW interface section 204 or the DL/UL MAP (map) produced by the scheduling section 203 from the transmission section 206 at a predetermined timing.

The transmission section 206 transmits the signal or the message from the buffer section 205 to the relay station 3A or the radio terminal 4-1. For example, the transmission section 206 transmits the scheduling information produced by the scheduling section 203 to the relay station 3A.

Working Effect

Since the relay station 3A and the radio base station 2A in the first embodiment are configured in such a manner as described above, for example, as illustrated in the signal sequence of FIG. 3, the relay station 3A can transmit the information of the BW Request Codes (request codes) #1 to #3 from the radio terminals 4-2 as an intensively collected controlling message to the radio base station 2A and transmit a CDMA Allocation (allocation) IE from the radio base station 2A to the radio terminals 4-2 while complementing the contents of the CDMA Allocation (allocation) IE.

In particular, the reception section 301 and the Code reception section 302 of the relay station 3A receive BW Request Codes (request codes) as signals or messages from the plural radio terminals 4-21 to 4-23 and store the information of the code number, frame position and frame number which are information of the received BW Request Codes (request codes) as communication controlling information for communication control between the relay station 3A and the radio terminals 4-21 to 4-23 into the storage section 303. Further, the intensive collection section 304 intensively collects the information of the BW Request Codes (request codes) from the radio terminals 4-21 to 4-23, and the notification section 305 and the transmission section 306 transmit the intensively collected information to the radio base station 2A (refer to "BW Request Message (request message)" in FIG. 3 and refer to FIG. 7).

Further, in the radio base station 2A, the reception section 201 and the controlling message extraction section 202 receive the intensively collected information described above from the relay station 3A, and the scheduling section 203 produces scheduling information (CDMA Allocation (allocation) IE of the UL MAP (map)) for communication between the radio base station 2A and the individual radio terminals 4-21 to 4-23 through the relay station 3A based on the received intensively collected information. Further, the buffer section 205 and the transmission section 206 transmit the scheduling information produced as just described to the relay station 3A (refer to reference character R1 in FIG. 3). At this time, particular information which forms a response to the BW Request Code (request code) is not included in the CDMA Allocation (allocation) IE which forms the produced scheduling information (in other words, the portion is left as a blank space).

The scheduling information transmitted from the radio base station 2A is received by the reception section 301 and the UL MAP (map) extraction section 307 of the relay station 3A, and the contents of the received scheduling information are complemented by the relay section 308 in accordance with the communication controlling information stored in the storage section 303 (in other words, particular information which configures a response to the BW Request Codes (request codes) is incorporated). Then, the scheduling information whose contents are complemented is transmitted to the radio terminals 4-21 to 4-23 by the transmission section 306 (refer to reference character R2 of FIG. 3)

It is to be noted that each of the radio terminals 4-21 to 4-23 extracts the CDMA Allocation (allocation) IE which is a response to the BW Request Code (request code) transmitted from the radio terminal itself from the frame position information and the CDMA code information in the CDMA Allocation (allocation) IE in the received UL MAP (map). Consequently, the radio terminals 4-21 to 4-23 can thereafter transmit a BW Request in a region designated in the Up Link Sub-frame in the UL MAP (map).

In this manner, with the first embodiment of the present invention, since the information of the UL MAP (map) corresponding to each of the radio terminals 4-21 to 4-23 can be complemented by the relay station 3A, there is an advantage that effective utilization of the radio communication resource can be achieved.

It is to be noted that, while the case wherein the plural radio terminals 4-21 to 4-23 are accommodated in the relay station 3A is described in the first embodiment described above, the present invention is not limited to this, and, also in a case wherein one radio terminal is accommodated, effective utilization of the radio communication resource can be achieved similarly as in the first embodiment.

[b] Description of the Second Embodiment of the Present Invention

While, in the first embodiment, the case is described wherein, where the relay station 3B is installed, the BW Request Code (request code) is transmitted as a band request signal from a radio terminal 4-2 and the CDMA Allocation (allocation) IE in the UL MAP (map) is transmitted as a response from the radio base station 2B, in the second embodiment, a case is described wherein a Ranging Code (ranging code) is transmitted from a radio terminal 4-2 and an RNG-RSP in the DL MAP (map) is transmitted as a response from the radio base station 2B.

It is to be noted that the Ranging Code (ranging code) is a code which is transmitted from the radio terminal 4-1 to the radio base station 2B shown in FIG. 1 to allow the radio terminal 4-1 to receive an instruction (RNG-RSP) for controlling the transmission power, transmission timing and transmission frequency in the radio terminal 4-1 from the radio base station 2B.

Where the relay station 3B is installed as in the present embodiment, a radio terminal 4-2 which exists within the cover area of the relay station 3B but outside the cover area of the radio base station 2B transmits the Ranging Code (ranging code) at a stage at which radio connection to the relay station 3B starts, and receives transmission power control and so forth through a response (RNG-RSP) from the relay station 3B. At this time, it is necessary to receive allocation of a band through a DL MAP (map) from the radio base station 2B in order that the relay station 3B transmits the RNG-RSP to the radio terminal 4-2. Accordingly, it is necessary for the relay station 3B to transmit information regarding the Ranging Code (ranging code) from the radio terminal 4-2 to the radio base station 2B.

Here, where the relay station 3B is installed, it is estimated that, if the relay station 3B receives the Ranging Codes (ranging codes) #1 to #3 from the plural radio terminals 4-21 to 4-23, then, in order for the radio base station 2B to carry out band allocation corresponding to the Ranging Codes (ranging codes) through the DL MAP (map), it becomes necessary every time of reception each Ranging Code (ranging code) to relay the information of the Ranging Code (ranging code) to the radio base station 2B together with the information of the reception timing (frame number, frame position).

On the other hand, in the second embodiment, it is anticipated that the information regarding the Ranging Code (ranging code) to be transmitted from the relay station 3B to the radio base station 2B is intensively collected and the relay station 3B produces an RNG-RSP to effectively utilize a band as hereinafter described.

Outline of a Signal Sequence in the Second Embodiment

Figure 9:
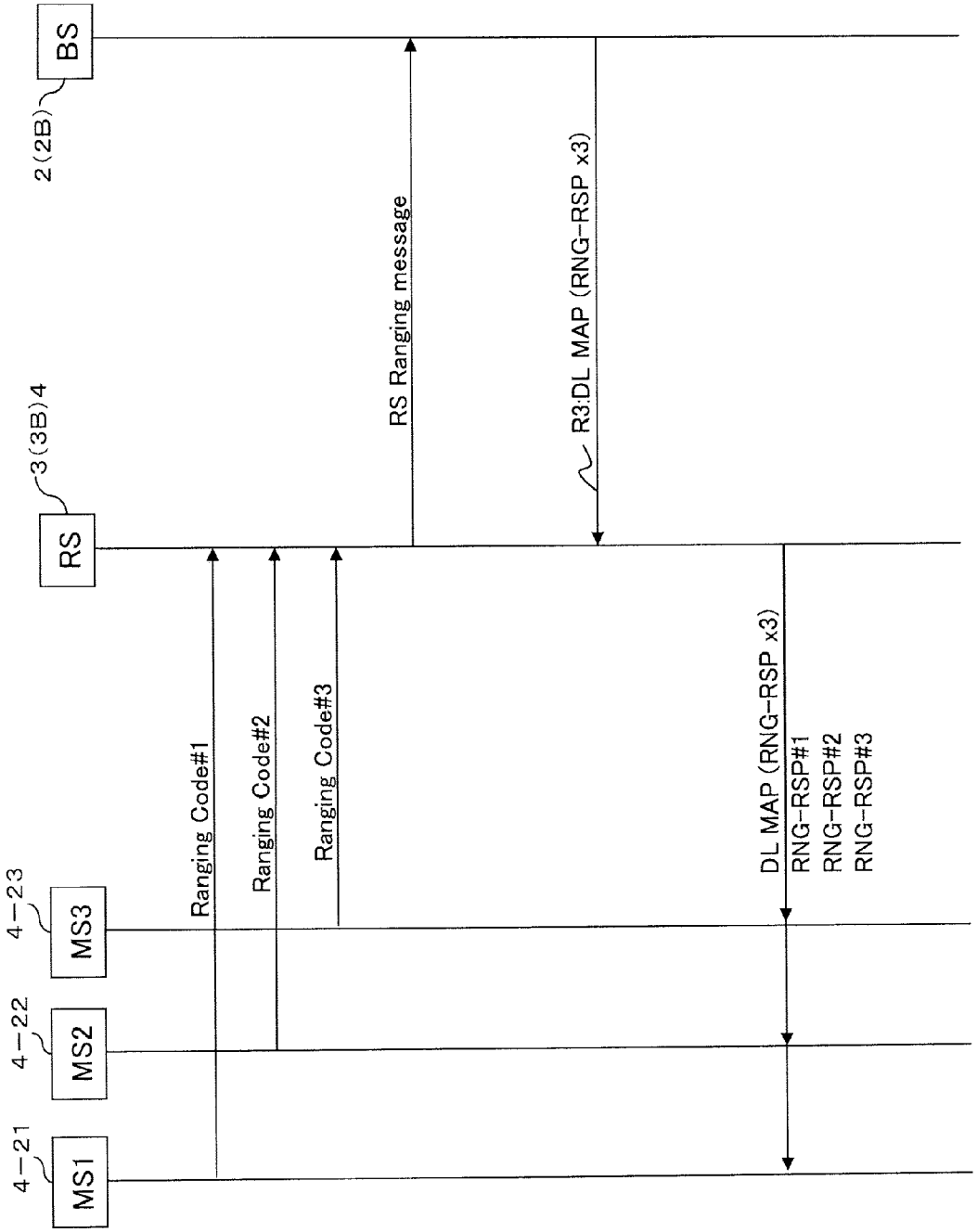
FIG. 9 is a view illustrating a signal sequence in a second embodiment of the present invention.

FIG. 9 is a view illustrating a signal sequence regarding Ranging Codes (ranging codes) signaled from the radio terminals 4-21 to 4-23 and response signals to the Ranging Codes (ranging codes). When the Ranging Codes (ranging codes) #1 to #3 are received from the radio terminals 4-21 to 4-23, respectively, not all information of the Ranging Codes (ranging codes) #1 to #3 including information regarding the reception ti ing (in other words, information regarding the transmission timing from each radio terminal 4) is transmitted in order to allow the radio base station 2B to produce a DL MAP (map) described above, but intensively collected information rather than all information regarding the Ranging Code (ranging code) is transmitted as a single RS Ranging Message (ranging message) to the radio base station 2B similarly as in the case of FIG. 3 of the first embodiment.

In particular, where the Ranging Codes (ranging codes) #1 to #3 are received from the plural radio terminals 4-21 to 4-23 connected to the relay station 3B, respectively, the relay station 3B stores adjustment information such as the power, timing, frequency and so forth (controlling information for adjusting the transmission power, timing and frequency from the radio terminals 4-21 to 4-23) to the radio terminal 4-21 to 4-23 together with the Ranging Codes (ranging codes) #1 to #3 and information of the reception positions of the Ranging Codes (ranging codes).

Then, the relay station 3B transmits, for example, following the case of the first embodiment, not patterns of the received Ranging Codes (ranging codes) themselves but information of the number of the received Ranging Codes (ranging codes) as the RS Ranging Message (ranging message) to the radio base station 2B. It is to be noted that transmission of the information, for adjusting the reception timings, power and so forth of the Ranging Codes (ranging codes) #1 to #3 stored in the relay station 3B itself as described above, to the radio base station 2B is omitted.

The radio base station 2B secures the number of regions for the RNG-RSP equal to the number of the Ranging Codes (ranging codes) received from the relay station 3B within a data region in the frame to produce a DL MAP (map). In particular, the radio base station 2B designates regions for the RNG-RSPs in the DL MAP (map) as responses R3 to the radio terminals 4-21 to 4-23 from which the Ranging Codes (ranging codes) #1 to #3 have been transmitted, respectively. It is to be noted that, since the radio base station 2B has not received the controlling information such as the transmission power, transmission timing and so forth from the relay station 3B, individual writing of the controlling information is not carried out for the designated regions RNG-RSP.

In particular, the transmission power controlling information and the phase controlling information or the frequency controlling information, which are to be written into the RNG-RSPs, for the radio terminals 4-21 to 4-23 are stored in the relay station 3B as described above. Therefore, the relay station 3B writes the contents of the information into the RNG-RSP regions designated by the DL MAP (map) and issues notifications of the transmission power controlling information, the controlling information of the transmission timing (phase) so forth as the RNG-RSPs #1 to #3 to the radio terminals 4-21 to 4-23, respectively.

Consequently, the transmission amount of the information regarding the Ranging Code (ranging code) particularly from the relay station 3B to the radio base station 2B can be reduced and the MMR #2 which is a radio communication resource of the upward link can be used efficiently.

Configuration of the Relay Station in the Second Embodiment

Figure 10:
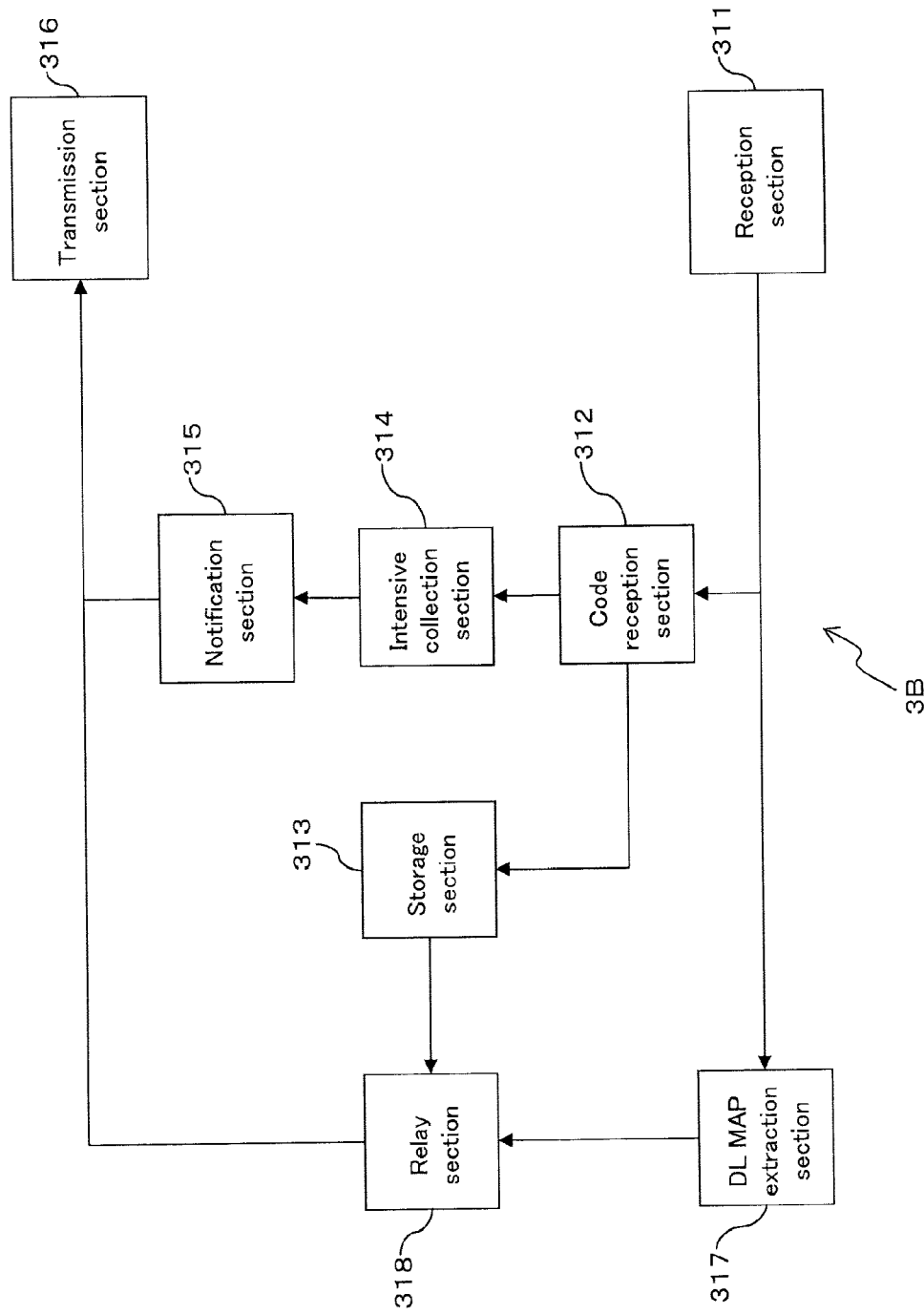
FIG. 10 is a block diagram illustrating a relay station in the second embodiment.

Taking notice of such a function for achieving enhancement of the efficiency of a radio communication resource as described above, the relay station 3B in the second embodiment includes a reception section 311, a Code reception section 312, a storage section 313, an intensive collection section 314, a notification 315, a transmission section 316, a DL MAP (map) extraction section 317 and a relay section 318 similarly to the relay station 3B shown in FIG. 10.

Here, the reception section 311 receives a radio signal which configures a signal or a message from the radio terminal 4-2 (refer to FIG. 1, any of the radio terminals 4-21 to 4-23 in FIG. 9) and the radio base station 2B. Meanwhile, the Code reception section 312 extracts, for example, a code (Code) such as a Ranging Code (ranging code) from the radio terminal 4-2 described above from the signal or the message received by the reception section 311.

In particular, the Code reception section 312 detects a frame number and a code value when a code is received, and detects information of a symbol (symbol) and a sub channel (subchannel) as position information of the radio frame when the code is received. Particularly, where the reception section 311 receives the Ranging Codes (ranging codes) from the radio terminals 4-21 to 4-23, the Code reception section 312 measures the reception power and the reception timings from the reception signals of the Ranging Codes (ranging codes) and stores power and timing adjustment information to the radio terminals 4-2 produced based on a result of the measurement into the storage section 313.

Accordingly, a terminal side signal reception section for receiving signals and messages from the plural radio terminals 4-21 to 4-23 and storing the information of the received signals and messages into the storage section 313 is configured from the reception section 311 and the Code reception section 312 described above. Particularly, the Code reception section 312 receives the Ranging Codes (ranging codes) which are power/timing adjustment signals from the plural radio terminals 4-21 to 4-23 and produces power/timing adjustment information for the corresponding radio terminals 4-21 to 4-23 from the received Ranging Codes (ranging codes) and then stores the kind (code kind) information and the position information as the Ranging Codes (ranging codes) as communication controlling information into the storage section 313 together with the produced power/timing adjustment information.

Further, a base station side signal reception section for receiving scheduling information (DL/UL MAP (map)) in the communication between the radio base station 2B and the individual plural radio terminals 4-21 to 4-23 through the relay station 3B from the radio base station 2B is configured from the reception section 311 described above.

Figure 11:
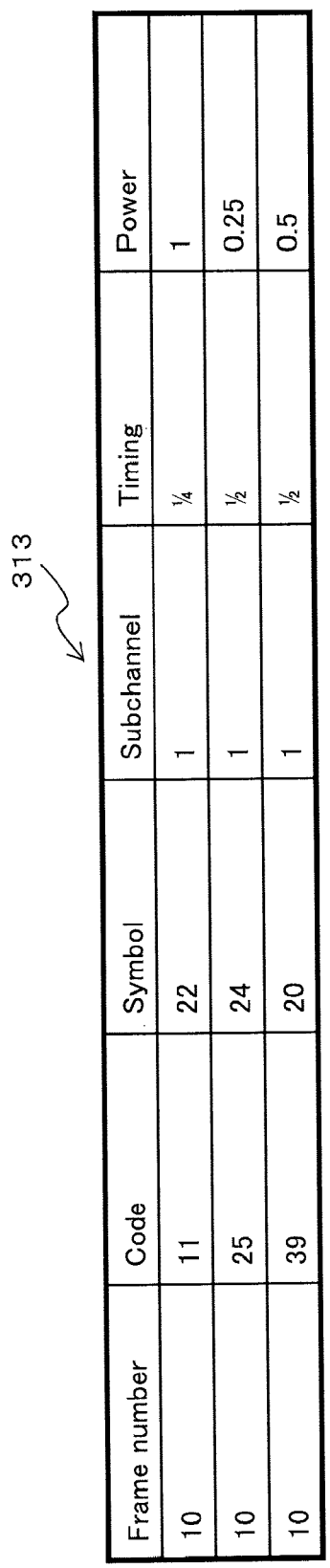
FIG. 11 is a view illustrating information to be stored in a storage section of the relay station in the second embodiment.

Furthermore, the storage section 313 stores communication controlling information (in this instance, information for producing the DL/UL MAP (map) which is scheduling information) for controlling communication with the plural radio terminals 4-21 to 4-23. In particular, as illustrated in FIG. 11, a code number (Code) and a frame number (Frame Number) extracted and detected by the Code reception section 312 and information of a symbol (Symbol) and a sub channel (Subchannel) which are information of the position of the radio frame when the code is received are stored as information relating to the Ranging Code (ranging code) received by the Code reception section 312, and timing adjustment information (Timing) and power adjustment information (Power) are stored as power/timing adjustment information.

The intensive collection section 314 intensively collects the power/timing adjustment signals from the plural radio terminals 4-21 to 4-23 to be transmitted to the radio base station 2B. In particular, where the Code reception section 312 receives the Ranging Codes (ranging codes) which are such power/timing adjustment signals from the radio terminals 4-21 to 4-23 as described above, the number of the Ranging Codes (ranging codes) received within the frame is counted and the information of the counted number of the Ranging Codes (ranging codes) is passed to the notification section 315 so as to be transmitted as a controlling message to the radio base station 2.

Consequently, the notification section 315 produces a controlling message based on the information of the number of the Ranging Codes (ranging codes) from the intensive collection section 314, and the transmission section 316 transmits the controlling message produced by the notification section 315 to the radio base station 2. It is to be noted that a band for transmission of the controlling message is allocated by the radio base station 2B when the relay station 3B receives the Ranging Code (ranging code) from the radio terminal 4-2.

An example of the configuration of the controlling message to be produced by the notification section 315 is illustrated in FIG. 12. As illustrated in FIG. 12, ID information of the relay station 3B which is identification information of the transmission source (RS ID), information of the kind (type) of the controlling message (Message Type), the frame number when the relay station 3B receives the Ranging Code (ranging code) (Frame Number) and the count value of the number of the Ranging Codes (ranging codes) at the time (No. Ranging Code) can be included in the controlling message.

Accordingly, a base station side signal transmission section for transmitting information intensively collected by the intensive collection section 314 to the radio base station 2 in order to produce a DL/UL MAP (map) which is scheduling information is configured from the notification section 315 and the transmission section 316 described above.

Further, the DL MAP (map) extraction section 317 extracts the DL MAP (map) from the signal from the radio base station 2 received by the reception section 311.

The power and timing adjustment information for the Ranging Code (ranging code) is written into the RNG-RSP whose region is designated by the DL MAP (map). Then, while the relay station 318 relays the DL MAP (map) extracted by the DL MAP (map) extraction section 317, regarding the information (symbol and sub channel) of the position of the radio frame originating particularly from the radio terminal which has transmitted the code, the DL MAP (map) is complemented with the contents stored in the storage section 313. Further, the relay section 318 writes the power/timing adjustment information to the radio terminals 4-21 to 4-23 into the RNG-RSP designated by the DL MAP (map). The signal into which the contents of the DL MAP (map) and the RNG-RSP are written in this manner is transmitted to the radio terminals 4-21 to 4-23 through the transmission section 316.

As described above, the position information, frame number, code value and so forth of a radio frame when the radio terminals 4-21 to 4-23 transmit the Ranging Codes (ranging codes) are stored into the storage section 313 of the relay station 3B, but are omitted from the contents to be transmitted to the radio base station 2B (contents of the controlling message in FIG. 12).

The relay station 318 writes the contents (information of the position, frame number, code value and so forth of the radio frame) stored in the storage section 313 to complement the contents of the DL MAP (map) extracted by the DL MAP (map) extraction section 317, and writes the power/timing adjustment information to the radio terminals 4-21 to 4-23 into the RNG-RSP region designated by the DL MAP (map) described above.

Accordingly, a complementation section for complementing the contents of scheduling information (from the radio base station 2B) received by the reception section 311 in accordance with communication controlling information stored in the storage section 313 is configured by the relay section 318 described above. In other words, the relay section 318 as the complementation section complements the RNG-RSP designated by the DL MAP (map) received by the reception section 311 using kind information and position information of the power/timing adjustment signal stored in the storage section 313.

Further, the transmission section 316 as the terminal side signal transmission section transmits the DL MAP (map) which is scheduling information whose contents are complemented by the relay section 318 and transmits the power/timing adjustment information produced by the Code reception section 312 to the plural radio terminals 4-21 to 4-23 through the RNG-RSP.

Consequently, the radio terminals 4-21 to 4-23 can extract the power/timing adjustment information corresponding to the Ranging Codes (ranging codes) transmitted individually from the radio terminals from the RNG-RSP referring to the DL MAP (map) and transmit a signal with the transmission power and at the timing based on the extracted adjustment information.

Configuration of the Radio Base Station 2B in the Second Embodiment

Figure 13:
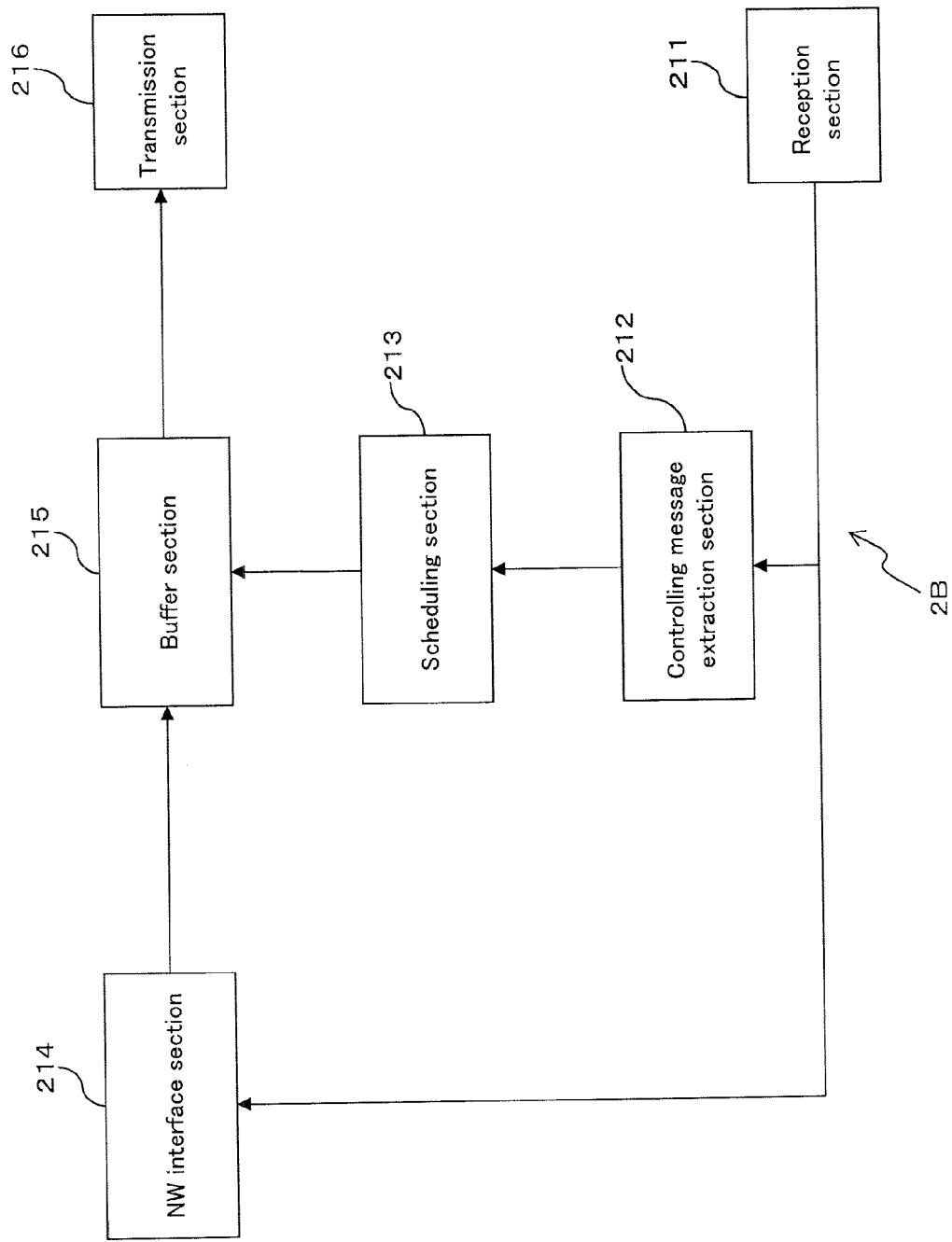
FIG. 13 is a block diagram illustrating a radio base station in the second embodiment.

Further, taking notice of such a function for achieving enhancement of efficiency of a radio communication resource as described above, the radio base station 2B in the second embodiment includes a reception section 211, a controlling message extraction section 212, a scheduling section 213, an NW interface section 214, a buffer section 215 and a transmission section 216 as shown in FIG. 13.

Here, the reception section 211 receives a radio signal which configures a signal or a message from the relay station 3B or the radio terminal 4-1 (refer to FIG. 1) and receives information from the transmission section 316 which configures the base station side signal transmission section in the relay station 3B. Further, the controlling message extraction section 212 extracts information of the controlling message from within the signal or the message received by the reception section 211. For example, the controlling message extraction section 212 extracts the contents of the controlling message for the notification of such number of the Ranging Codes (ranging codes) as shown in FIG. 12 from the relay station 3B.

The scheduling section 213 produces a DL/UL MAP (map) which is scheduling information from the contents described in the controlling message extracted by the controlling message extraction section 212. For example, when the controlling message extraction section 212 extracts such a controlling message for the notification of the number of Ranging Codes (ranging codes) as shown in FIG. 12, the scheduling section 213 secures the number of RNG-RSPs equal to the number of the Ranging Codes (ranging codes) based on the DL MAP (map). At this time, the information of the position, the frame number, the code value and so forth of the radio frame are not described in the DL MAP (map), and particular power/timing adjustment information which makes a response to the Ranging Codes (ranging codes) is not included in the RNG-RSPs.

Accordingly, the scheduling section 213 described above functions as a scheduling information production section for producing a DL MAP (map) which is scheduling information except for information to be complemented by the relay section 318 of the relay station 3B described above based on a message for the notification of the number of Ranging Codes (ranging codes) received by the reception section 211. In other words, the scheduling section 213 carries out, based on the information received by the reception section 211, allocation of the number of bands equal to the number of the Ranging Codes (ranging codes) intensively collected to the information received by the reception section 211 to produce a DL MAP (map) which is scheduling information.

The NW interface section 214 carries out an interface process in order to signal the data from the radio terminal 4 received by the reception section 211, for example, to a different network and carries out another interface process for a signal from the different network destined for a radio terminal 4. Further, the buffer section 215 carries out buffering for data from the NW interface section 214 or a DL/UL MAP (map) produced by the scheduling section 213 in order to allow transmission of the data or the DL/UL MAP (map) from the transmission section 216 at a predetermined timing.

The transmission section 216 transmits a signal or a message from the buffer section 215 to the relay station 3B or the radio terminal 4-1. In particular, the transmission section 216 transmits the DL MAP (map) which is produced by the scheduling section 213 as described above and wherein a region within a RNG-RSP is designated as described above to the relay station 3B or the terminal 4-1.

Working Effect

In the second embodiment, since the relay station 3B and the radio base station 2B are individually configured in such a manner as described above, for example, as illustrated in the signal sequence of FIG. 9, the relay station 3B can transmit a controlling message wherein information of the Ranging Codes (ranging codes) #1 to #3 from the radio terminals 4-21 to 4-23 is intensively collected to the radio base station 2B, and can transmit power/timing adjustment information corresponding to the individual radio terminals 4-21 to 4-23 in RNG-RSP whose region is designated by a DL MAP (map) from the radio base station 2B while complementing the contents of the DL MAP (map) and RNG-RSP.

In particular, if the reception section 311 and the Code reception section 312 of the relay station 3B receive, for example, Ranging Codes (ranging codes) as signals and messages from the plural radio terminals 4-21 to 4-23, then information of the code number, frame position and frame number which is information of the received Ranging Codes (ranging codes) is stored as communication controlling information for the communication control between the radio terminals 4-21 to 4-23 and the relay station 3B into the storage section 313. Further, the Code reception section 312 measures the reception power and the reception timing from the reception signal of the received Ranging Codes (ranging codes) and stores power/timing adjustment information to the radio terminals 4-21 to 4-23 produced based on the result of the measurement into the storage section 313.

Further, the intensive collection section 314 intensively collects the information of the Ranging Codes (ranging codes) from the radio terminals 4-21 to 4-23, and the notification section 315 and the transmission section 316 transmit the intensively collected information to the radio base station 2B (refer to "RS Ranging Message (ranging message)" in FIG. 9 and to FIG. 12).

Further, in the radio base station 2B, the reception section 211 and the controlling message extraction section 212 receive the intensively collected information described above from the relay station 3B, and the scheduling section 213 produces scheduling information (DL MAP (map)) for the communication between the relay station 3B and the individual radio terminals 4-21 to 4-23 based on the received intensively collected information. Then, the buffer section 215 and the transmission section 216 transmit the scheduling information produced as described above to the relay station 3B (refer to reference character R3 in FIG. 9). At this time, particular power/timing adjustment information as a response to the Ranging Codes (ranging codes) is not included in the RNG-RSP whose region is designated by the DL MAP (map), and the portion is left substantially as a blank space.

The reception section 311 and DL MAP (map) extraction section 317 of the relay station 3B receive the scheduling information transmitted from the radio base station 2B, and the relay section 318 complements the contents of the DL MAP (map) which is the received scheduling information in accordance with the communication controlling information stored in the storage section 313 and writes the power/timing adjustment information to the radio terminals 4-21 to 4-23 into the RNG-RSP. Then, the transmission section 316 transmits the power/timing adjustment information to the radio terminals 4-21 to 4-23 through the RNG-RSP regions together with the scheduling information whose contents are complemented.

It is to be noted that each of the radio terminals 4-21 to 4-23 can extract the power/timing adjustment information corresponding to the Ranging Code (ranging code) transmitted from the radio terminal from the RNG-RSP region while referring to the contents of the DL MAP (map), and transmit a signal with transmission power and at a timing in accordance with the extracted adjustment information.

In this manner, with the second embodiment of the present invention, there is an advantage that, since the relay station 3 can complement information of the DL MAP (map) corresponding to the radio terminals 4-21 to 4-23 and write power/timing adjustment information into the RNG-RSP region, information to be transmitted to the radio base station 2B can be reduced to achieve effective utilization of a radio communication resource.

It is to be noted that, while the case wherein the plural radio terminals 4-21 to 4-23 are accommodated by the relay station 3B is described in the second embodiment described above, the present invention is not limited to this, and, also in a case wherein one radio terminal is accommodated, effective utilization of a radio communication resource can be achieved similarly.

[c] Description of the Third Embodiment

In the third embodiment, a case is described wherein, in a radio communication system which includes a radio base station 2 and a radio terminal 4 and into which a relay station 3 is installed similarly as in the cases of the first and second embodiments described above, a CQI (Channel Quality Indicator) report is received by the relay station 3. It is to be noted that the CQI report is used for the notification of radio signal quality in the radio terminal 4-2 to the radio base station 2 through the relay station 3. The radio base station 2 can receive the CQI report from the radio terminal 4-2 at fixed cyclical intervals and adaptively change over the radio communication method to an optimum one based on the varying value of the CQI. For example, if the reception quality is good, then a radio communication method suitable for high-speed communication can be applied, but, if the reception quality is not good, then another radio communication method which has a comparatively high tolerance for a noise environment, although the communication speed, is low can be applied. It is to be noted that, for example, as the CQI, a CINR (Career to Interference and Noise Ratio) which is a quality parameter value which can be measured without decoding a reception signal is available.

Outline of a Signal Sequence in the Third Embodiment

Figure 14:
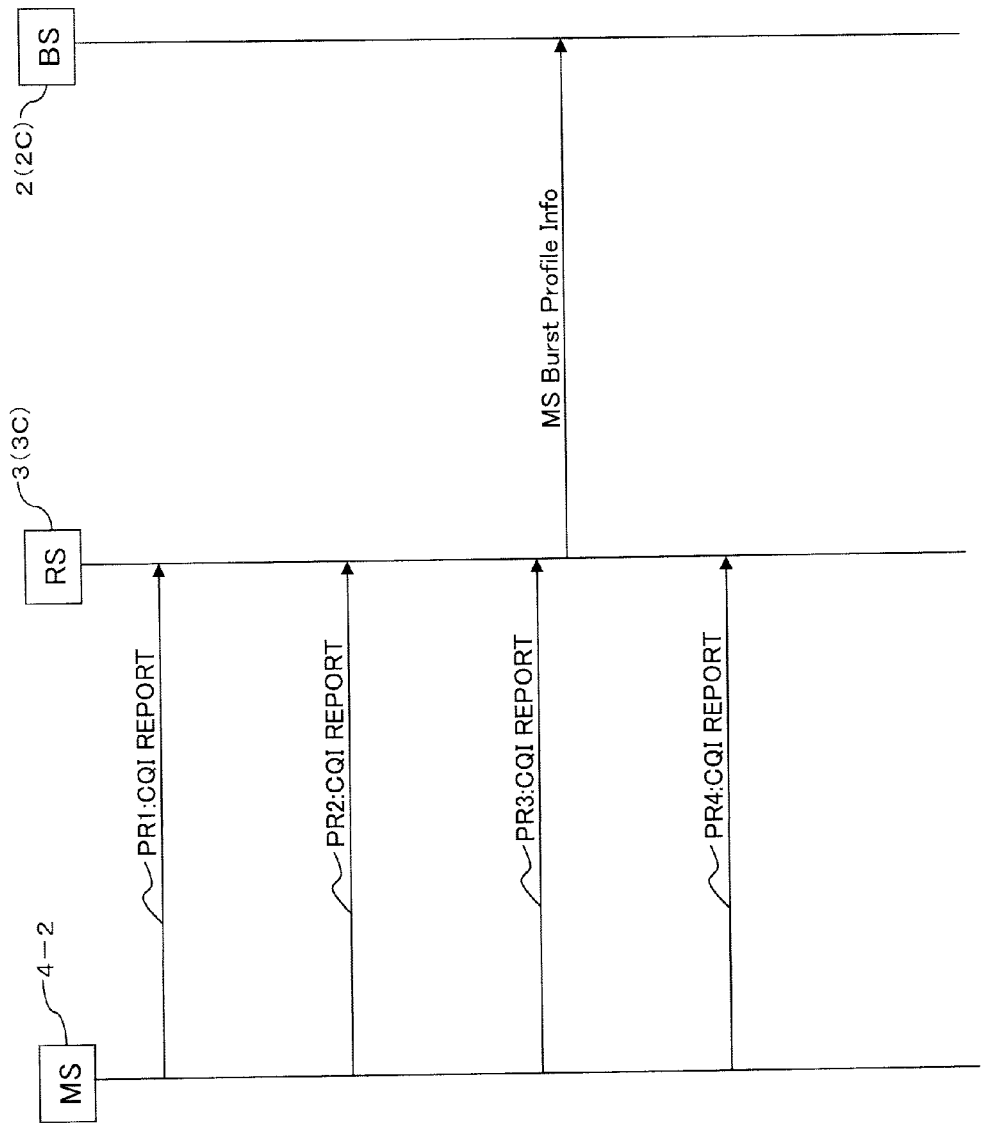
FIG. 14 is a view illustrating a signal sequence in the third embodiment of the present invention.

FIG. 14 is a view illustrating a signal sequence regarding a CQI report to be transmitted from the radio terminal 4-2 (refer to FIG. 1) and a response signal to the CQI report in the third embodiment of the present invention. As illustrated in FIG. 14, the relay station 3 carries out, when CQI reports PR1 (Periodic Report) to RP4 received in a fixed period from the connected radio terminal 4-2 are received, comparison for every time of the reception with CQI report information in the preceding operation cycle stored in the relay station 3. It is to be noted that, while description is given here taking notice of a case wherein a CQI report is received from one radio terminal 4-2 connecting to the relay station 3, the description applies similarly also to a case wherein a plurality of the radio terminals 4-2 are connected.

Then, only when it is decided from a result of the comparison that the radio communication method used between the relay station 3 and the radio terminal 4-2 is to be changed, the relay station 3 issues a notification of the information of the radio communication method to be used between the relay station 3 and the radio terminal 4-2 to the radio base station 2. For example, the relay station 3 compares, based on the contents of the CQI report PR3 from the radio terminal 4-2, the contents of the CQI report RP3 with the contents of the CQI report received in the past (for example, the CQI report PR2 in the preceding operation cycle) to decide whether or not the radio communication method is to be changed and determine also a radio communication method after the change. Then, the relay station 3 issues a notification of the changing information relating to the radio communication method (MS Burst Profile Info).

The radio base station 2 carries out scheduling based on the information of the changed radio communication method from the radio terminals 4-21 to 4-23 to produce a DL/UL MAP (map) and transmits the produced DL/UL MAP (map) to the relay station 3. Consequently, the information amount to be communicated between the relay station 3 and the radio base station 2 is reduced to achieve effective utilization of a radio communication resource.

Configuration of the Relay Station in the Third Embodiment

Figure 15:
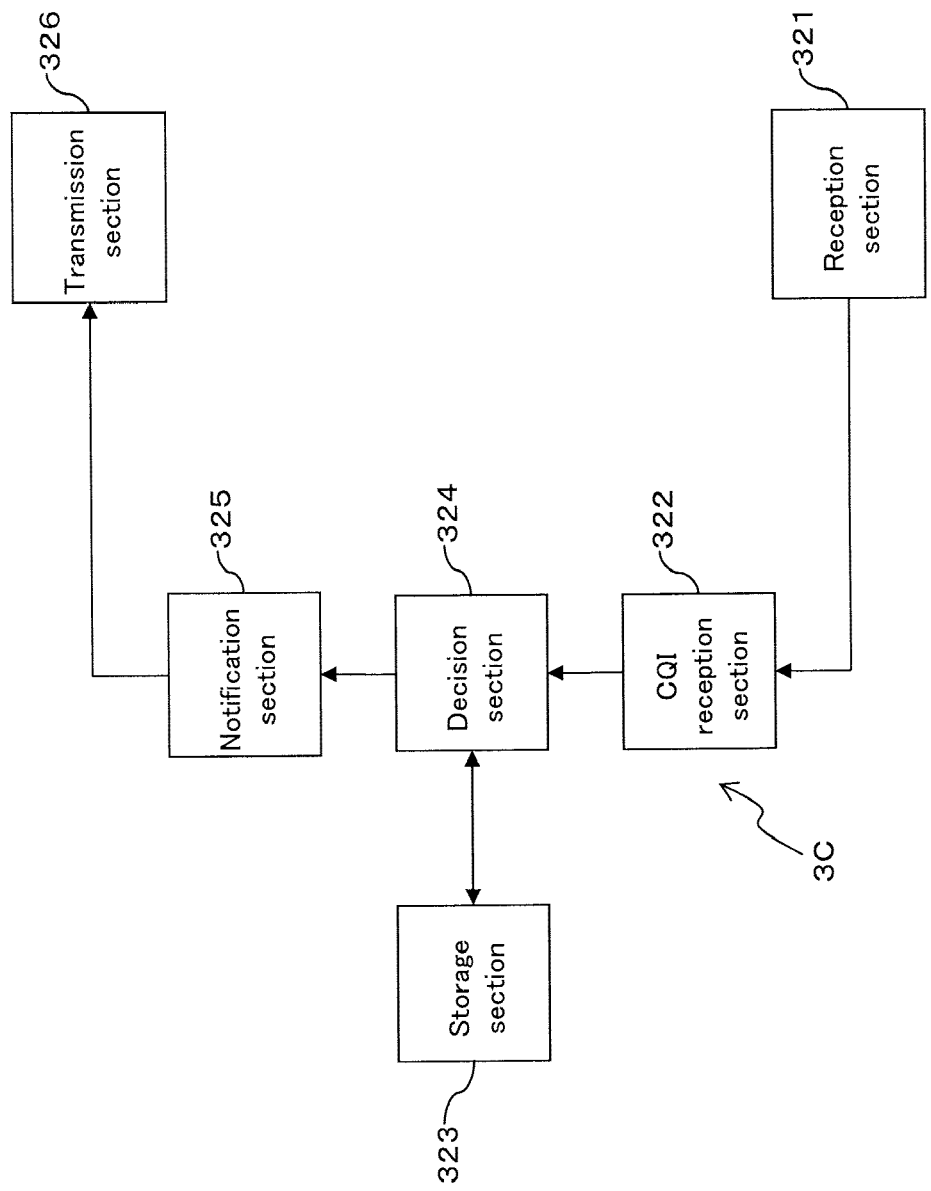
FIG. 15 is a block diagram illustrating a relay station of a third embodiment.

Taking notice of such a function for achieving enhancement of the efficiency of a radio communication resource as described above, the relay station 3 in the third embodiment includes a reception section 321, a CQI reception section 322, a storage section 323, a decision section 324, a notification section 325 and a transmission section 326 similarly to the relay station 3C shown in FIG. 15.

Here, the reception section 311 receives a signal or a message from the radio terminal 4-2 and the radio base station 2. Further, the CQI reception section 322 extracts a CQI report which is a signal or a message which indicates a state of the radio channel from the signal or the message from the radio terminal 4-2 received by the reception section 321. Accordingly, the reception section 321 and the CQI reception section 322 described above configure a terminal side reception section for receiving information of a signal and a message received from a radio terminal.

Figure 16:
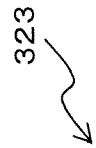
FIG. 16 is a view illustrating information to be stored in a storage section of the relay station in the third embodiment.

The storage section 323 stores the contents of the CQI report from the radio terminal 4-2 received by the CQI reception section 322 for each radio terminal 4-2. Information to be stored into the storage section 323 is illustrated in FIG. 16. As illustrated in FIG. 16, the storage section 323 stores, for each radio terminal 4-2 connected to the relay station 3, also an MS ID which is ID information of the radio terminal, a CINR value and an index value of the radio communication method (Burst Profile) suitable for the CINR value through a writing action by the decision section 324 hereinafter described.

Further, the decision section 324 decides based on the information received by the CQI reception section 322 whether or not a notification of relating information relating to the signal and the message received from the radio terminal 4-2 is to be issued to the radio base station 2. In particular, when the radio communication method to be used between the relay station 3 and the radio terminal 4-2 need to be changed based on the CQI information received by the CQI reception section 322, that is, based on the information relating to the radio channel state between the relay station 3 and the radio terminal 4-2, the decision section 324 decides that a notification of the information relating to the radio channel state is to be issued to the radio base station 2.

In particular, the decision section 324 first refers to a table not shown stored in the storage section 323 to extract and select a radio communication method suitable for the information received by the CQI reception section 322. In other words, for example, when the quality is comparatively high in response to the CINR value, the decision section 324 extracts and selects a radio communication method suitable for comparatively high-speed transmission, but, when the quality is comparatively low, the decision section 324 extracts and selects a radio communication method which is suitable for comparatively low-speed transmission and besides has a comparatively high tolerance for noise. It is to be noted that, as the radio communication method to be selected, a modulation method, a coding method, a coding ratio and so forth can be used as parameters (factors).

Then, a difference between the radio communication method extracted and selected in this manner and the radio communication method extracted from the CINR value in the CQI report received last and stored in the storage section 323 is decided. If the radio communication methods are different from each other as a result of the decision, then it is decided that the radio communication method used between the relay station 3 and the radio terminal 4-2 needs to be changed to the newly extracted and selected radio communication method, but, if the radio communication methods are same as each other as a result of the decision, then it is decided that the radio communication method used between the relay station 3 and the radio terminal 4-2 needs not to be changed.

It is to be noted that, if such a decision regarding the radio communication method as described above ends, then the decision section 324 can write, for every time of the end of the decision, the CINR value and the extracted and selected radio communication method into the storage section 323 in an associated relationship with the ID information of the corresponding radio terminal 4-2.

When it is decided by the decision section 324 that a notification of the changing information of the radio communication method which is information relating to the state of the radio channel received from the radio terminal 4-2 is to be issued to the radio base station 2 (that is, the radio communication method is to be changed), the notification section 325 produces, as a controlling message, the changing information of the radio communication method as relating information and outputs the produced information to the transmission section 326 at the following stage. The transmission section 326 transmits the controlling message produced by the notification section 325 to the radio base station 2. Accordingly, the changing information of the radio communication method described above is conveyed to the radio base station 2 by cooperation of the notification section 325 and the transmission section 326.

On the other hand, when it is decided by the decision section 324 that a notification of the changing information of the radio communication method needs not to be issued (that is, the radio communication method need not to be changed), a notification of the changing information of the radio communication method as the relating information is not issued through the notification section 325 and the transmission section 326.

Figure 17:
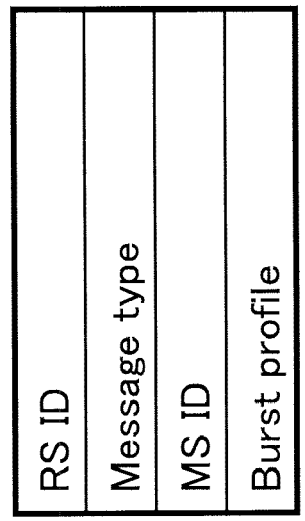
FIG. 17 is a view illustrating an example of a configuration of a controlling message to be produced by a notification section of the relay station in the third embodiment.

FIG. 17 illustrates an example of information of a controlling message to be transmitted from the relay station 3C to the radio base station 2 for changing the radio communication method. The information of the controlling message can be configured from an ID of the relay station 3 which indicates a transmission source of the controlling message (RS ID), a type which indicates the present controlling message (Message Type), an ID of the radio terminal decided to be necessary to change the radio communication method (MS ID) by the decision section and an index value of the radio communication method to be changed (Burst Profile).

It is to be noted that the radio base station 2 recognizes the radio communication method to be used between the relay station 3 and the radio terminal 4-2 based on the received controlling message and produces a DL/UL MAP (map) based on the recognized radio communication method.

Working Effect

Since the relay station 3C in the third embodiment is configured in such a manner as described above, when the CQI reports PR1 to PR4 received at fixed intervals from the radio terminal 4-2 connected to the relay station 3C are received, the relay station 3C may not transmit, for every time of reception, the contents of the CQI report to the radio base station 2 in order to produce a DL/UL MAP (map), but may transmit the contents of the CQI report only when it decides to be necessary to change the radio communication method based on the contents of the CQI.

In particular, the decision section 324 of the relay station 3C carries out comparison between the CQI report information in the preceding operation cycle stored in the storage section 323 and the radio communication method information obtained from the CQI report in the present operation cycle. Then, only when it is decided from a result of the comparison that the radio communication method to be used between the relay station 3C and the radio terminal 4-2 is to be changed, a notification of the information of the radio communication method to be used between the relay station 3 and the radio terminal 4-2 is issued as a controlling message to the radio base station 2.

In this manner, with the third embodiment, since opportunities that the relay station 3C transmits a controlling message relating to the contents of a CQI report transmitted from the radio terminal 4-2 can be reduced in comparison with those in a case wherein a controlling message is transmitted for every time of reception of a CQI report, there is an advantage that information to be signaled to the radio base station 2B can be reduced to achieve effective utilization of a radio communication resource.

[b] Others

The present invention is not limited to the embodiments specifically described above, and variations and modifications can be made without departing from the scope of the present invention.

For example, while, in the relay stations 3A and 3B in the first and second embodiments described above, the storage sections 303 and 313 store information of a signal or a message in the upward direction from the radio terminal 4-2 as communication controlling information, the present invention is not limited to this, and, for example, where information to be complemented as scheduling information by the complementation section is known, not the information of the signal or the message in the upward direction from the radio terminal 4-2 but the information just described may be stored in advance in the storage sections 303 and 313.

Further, with the relay station of the present invention, also signals other than a band request signal such as the BW Request Code (request code) described above or a power/timing adjustment signal such as the Ranging Code (ranging code) described above can be intensively collected by the intensive collection section, and as a result, effective utilization of a band can be achieved.

Further, the apparatus of the present invention can be fabricated by a person skilled in the art based on the disclosure of the embodiments described above.

What is claimed is:

1. A relay station which relays a signal to be transferred between a radio base station and a radio terminal, the relay station comprising:
   a terminal side reception section adapted to receive information of a signal and a message transmitted from the radio terminal;
   a decision section adapted to decide based on the information received by said terminal side reception section whether or not a notification of the information relating to the signal and the message received from the radio terminal is to be issued to the radio base station; and a
   notification section adapted to issue the notification of the relating information to the radio base station when it is decided by said decision section that the notification of the information relating to the signal and message received from the radio terminal is to be issued to the radio base station.

2. The relay station as claimed in claim 1, wherein said terminal side reception section receives information of a signal and a message relating to a radio channel state between the relay station and the radio terminal transmitted from the radio terminal;
   said decision section decides, based on the information relating to the radio channel state between the relay station and the radio terminal received by said reception section, that a notification of the relating information is to be issued to the radio base station when a radio communication method used between the relay station and the radio terminal need be changed; and said notification section issues, when it is decided by said decision section that the radio communication method need be changed, a notification of at least one of the radio channel information and the radio communication method between the relay station and the radio terminal as a notification of the relating information to the radio base station.

3. A radio communication system comprising a radio terminal, a radio base station for transmitting and receiving a signal to and from the radio terminal, and a relay station for relaying a signal transferred between the radio terminal and the radio base station;

the relay station comprising:

a radio channel state reception section adapted to receive information of a signal and a message relating to a radio channel state between the relay station and the radio terminal from the radio terminal;

a decision section adapted to decide based on the information received by the channel state reception section whether or not a radio communication method to be used between the relay station and the radio terminal need to be changed; and a notification section adapted to issue, when it is decided by the decision section that the radio communication method needs to be changed, a notification of at least one of radio channel information and the radio communication method between the relay station and the radio terminal as relating information to the radio base station;

the radio base station comprising:

a scheduling information production section adapted to change a radio communication method to be used between the radio base station and the radio terminal through the relay station and produce scheduling information in communication wherein the radio communication method is changed based on the relating information issued from the notification section; and a transmission section adapted to transmit the scheduling information produced by the scheduling information production section to the relay station.

4. The radio communication system as claimed in claim 3, wherein the radio communication method which is a target of the change includes a modulation method, a coding method and a coding ratio as elements thereof.

* * * * *